(12) United States Patent
Ochi et al.

(10) Patent No.: US 8,312,186 B2
(45) Date of Patent: Nov. 13, 2012

(54) STORAGE SUBSYSTEM

(75) Inventors: Takashi Ochi, Odawara (JP); Takahiko Takeda, Minamiashigara (JP); Yasuhiko Yamaguchi, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 271 days.

(21) Appl. No.: 12/668,058

(22) PCT Filed: Sep. 29, 2009

(86) PCT No.: PCT/JP2009/005000
§ 371 (c)(1),
(2), (4) Date: Jan. 7, 2010

(87) PCT Pub. No.: WO2011/039802
PCT Pub. Date: Apr. 7, 2011

(65) Prior Publication Data
US 2012/0030384 A1    Feb. 2, 2012

(51) Int. Cl.
*G06F 3/00* (2006.01)
*G06F 5/00* (2006.01)
(52) U.S. Cl. ........................................ 710/39
(58) Field of Classification Search ............ 710/39
See application file for complete search history.

(56) References Cited

U.S. PATENT DOCUMENTS

| 5,787,473 | A | 7/1998 | Vishlitzky et al. |
| 2005/0044287 | A1* | 2/2005 | Nishizono et al. ............... 710/15 |
| 2007/0180188 | A1* | 8/2007 | Fujibayashi et al. ........... 711/112 |
| 2007/0220195 | A1 | 9/2007 | Kawaguchi |
| 2008/0126645 | A1* | 5/2008 | Yamaguchi et al. ........... 710/117 |
| 2008/0126668 | A1* | 5/2008 | Okuno et al. ................. 711/100 |
| 2008/0263190 | A1 | 10/2008 | Serizawa et al. |

FOREIGN PATENT DOCUMENTS

| EP | 1 818 794 A2 | 8/2007 |
| EP | 1 986 090 A2 | 10/2008 |
| JP | 2008-269424 A | 11/2008 |

* cited by examiner

*Primary Examiner* — Chun-Kuan Lee
*Assistant Examiner* — Brooke Taylor
(74) *Attorney, Agent, or Firm* — Mattingly & Malur, PC

(57) ABSTRACT

The correspondence of the respective ports and the respective microprocessors is dynamically changed based on the load of the respective microprocessors. When an open port MP including a plurality of ports connected to a host computer receives an I/O request from the host computer via a port, it specifies an MPPK to become the transfer destination of the I/O request, and transfers the I/O request to the specified MPPK. Each MP belonging to the MPPK that received the I/O request selects either an exclusive mode where a single MP exclusively performs the processing of the I/O request, or a share mode where two or more MPs share the processing of the I/O request. Each MP selects the exclusive mode or the share mode corresponding to when load information concerning the ports shows a low load or high load condition, respectively, and executes the I/O processing accordingly.

12 Claims, 49 Drawing Sheets

FIG.13

| MP# | PORT #0 | PORT #1 | PORT #2 | PORT #3 | ··· | PORT #N-1 |
|---|---|---|---|---|---|---|
| MP0 | 1 | 0 | 0 | 1 | ··· | 1 |
| MP1 | 0 | 1 | 0 | 1 | ··· | 1 |
| MP2 | 0 | 0 | 1 | 1 | ··· | 0 |
| MP3 | 0 | 0 | 0 | 0 | ··· | 0 |
| NUMBER OF PROCESSING MPs | 1 | 1 | 1 | 3 | ··· | 2 |

FIG.23

| MP# | #0 | #1 | #2 | ... | #N-1 |
|---|---|---|---|---|---|
| MP0 | 40 | 0 | 0 | ... | 45 |
| MP1 | 0 | 60 | 0 | ... | 30 |
| MP2 | 0 | 0 | 30 | ... | 0 |
| MP3 | 0 | 0 | 0 | ... | 0 |
| TOTAL | 40 | 60 | 30 | ... | 75 |

STORAGE SUBSYSTEM

TECHNICAL FIELD

The present invention relates to a storage subsystem that performs I/O processing to a plurality of logical storage devices to which storage areas of a plurality of storage devices are allocated.

BACKGROUND ART

In a storage subsystem, a plurality of logical storage devices to which storage areas of a plurality of storage devices are allocated are provided in a recognizable manner to a host computer, whereby the host computer is able to perform the I/O processing of data to the relevant logical storage device.

When a storage subsystem receives an I/O request from a host computer, a microprocessor provided in the storage subsystem controls the I/O processing according to the I/O request; for instance, data write processing of writing data into a storage device, and data read processing of reading data from a storage device.

Among these kinds of storage subsystems, proposed is a type comprising a plurality of controllers including a plurality of microprocessors and a local memory for executing I/O processing with a storage device, and further comprising a management table for managing the controller to handle the I/O processing to the logical storage area of the storage device (refer to PTL 1).

With the system described in PTL 1, for instance, if a host computer issues an I/O request to a logical storage area of a storage device via a port, a host interface unit specifies the controller to handle the I/O processing of the logical storage area of the storage device based on a management table, transfers the I/O request to the specified controller, and any one of the microprocessors in the controller that received the I/O request executes the I/O processing to the logical storage area of the storage device.

According to the system described in PTL 1, since the correspondence of the logical storage area of the storage device and the respective controllers is managed with the management table, the correspondence of the logical storage area of the storage device and the respective controllers can be set arbitrarily, and the microprocessor to handle the processing of the I/O request can be arbitrarily set among the plurality of microprocessors in the controller without having to fix the correspondence of the port and the microprocessor.

CITATION LIST

Patent Literature

[PTL 1]
Japanese Unexamined Patent Publication No. 2008-269424

SUMMARY OF INVENTION

Technical Problem

Nevertheless, with the foregoing conventional technology, if the number of ports of the host interface unit is increased pursuant to the increase in the number of I/O requests from the host computer, the number of ports in which the respective microprocessors in the controller are to handle the processing will increase. Thus, much time will be required for deciding the microprocessor to handle the processing of the I/O request that was input into the respective ports.

Meanwhile, when adopting a configuration where a plurality of microprocessors share the processing of the I/O request input into one port, although it will be possible to shorten the time required for deciding the microprocessor to handle the processing of the I/O request, if the processing to the same I/O request is in conflict among a plurality of microprocessors, overhead will arise in each of the conflicting microprocessors, and there is a problem in that the response time may deteriorate.

The present invention was devised in view of the problems encountered in the conventional technology described above. Thus, an object of this invention is to provide a storage subsystem capable of dynamically changing the correspondence of the respective ports and the respective microprocessors based on the load of the respective microprocessors.

Solution to Problem

In order to achieve the foregoing object, the present invention provides a storage subsystem comprising a first interface unit for sending and receiving information to and from a host computer via a plurality of ports, and a plurality of controllers for performing data I/O processing to a plurality of virtual devices to which at least a part of a storage area of the storage device is allocated. Each of the controllers includes a plurality of microprocessors for performing data I/O processing to the virtual devices. When the host computer issues a data I/O request via each of the ports, the first interface unit specifies a controller to handle the data I/O processing to the one virtual device according to the I/O request among the plurality of controllers based on the I/O request, and transfers the I/O request to the specified controller. The controller that received the I/O request selects, based on load information concerning each of the ports, one of either an exclusive mode where a single microprocessor among the plurality of microprocessors exclusively performs the data I/O processing to the one virtual device or a share mode where two or more microprocessors share the data I/O processing to the one virtual device, and executes processing according to the selected exclusive mode or share mode.

Advantageous Effects of Invention

According to the present invention, the correspondence of the respective ports and the respective microprocessors can be dynamically changed based on the load of the respective microprocessors.

BRIEF DESCRIPTION OF DRAWINGS

FIG. 13 is a basic configuration diagram of a master bitmap table.

FIG. 23 is a configuration diagram of a port utilization ratio table.

DESCRIPTION OF EMBODIMENTS

Examples

This example explains a case where, when a host computer issues an I/O request via the respective ports, a controller to handle the processing of the I/O request to a plurality of virtual devices is decided among a plurality of controllers for controlling the I/O processing of data, and the decided controller selects one of either an exclusive mode where a single microprocessor exclusively performs the data I/O processing or a share mode where two or more microprocessors share the data I/O processing, and executes processing according to the selected exclusive mode or share mode.

Figure 1:
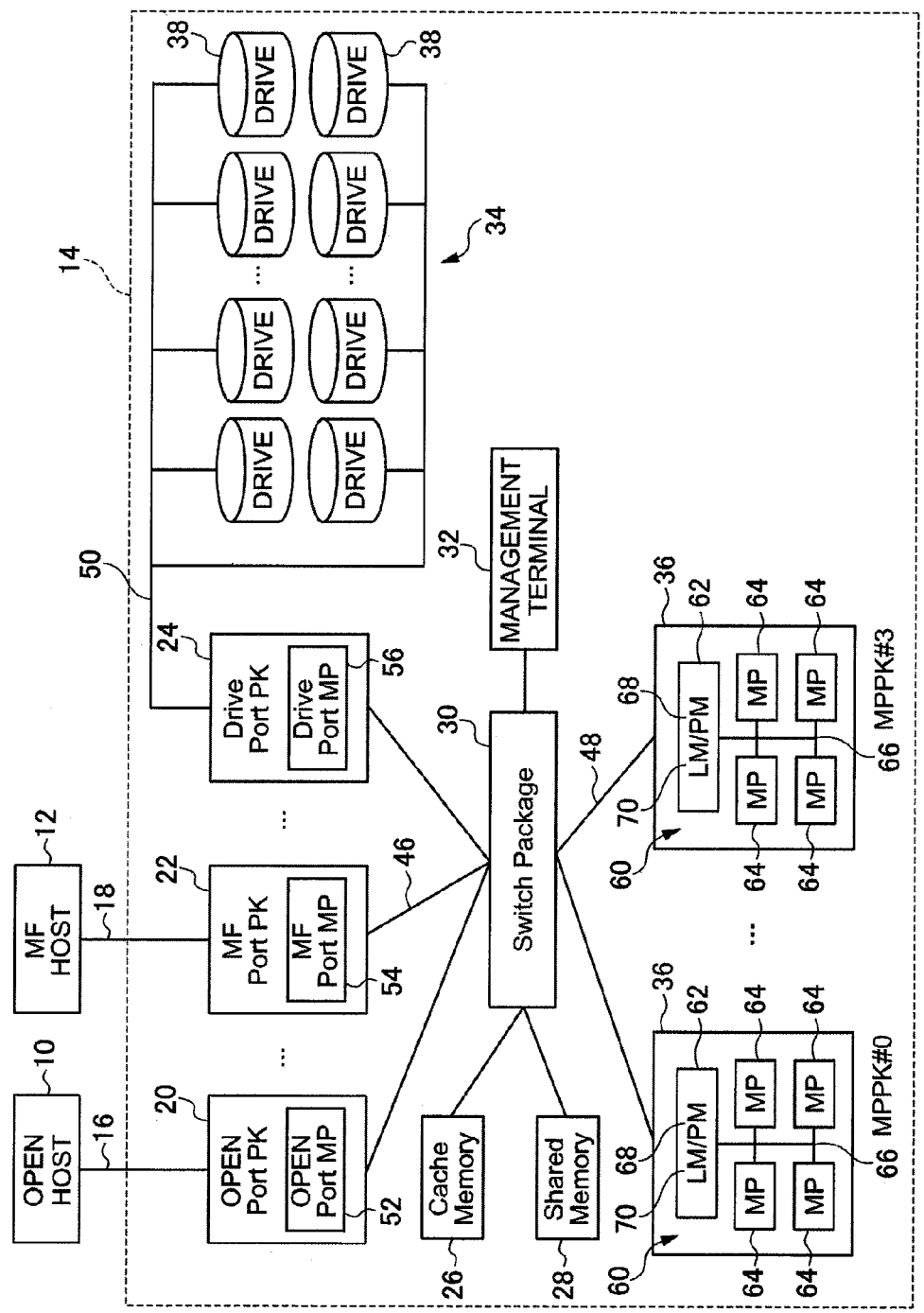
FIG. 1 is a block configuration diagram of the storage system according to the present invention.

An example of the present invention is now explained with reference to the attached drawings. FIG. 1 is a configuration diagram of the storage system according to an example of the present invention.

In FIG. 1, the storage system comprises a plurality of host computers 10, 12, and a storage subsystem 14, and the respective host computers 10, 12 and the storage subsystem 14 are mutually connected via networks 16, 18.

The host computer 10 is configured as an open system computer by comprising, for example, a microprocessor (CPU), a memory for storing programs such as an operating system (OS) and application programs, an input device for inputting information, a display device for displaying information, and so on. As the network 16, for instance, a fibre channel may be used.

The host computer 12 is configured as a mainframe computer by comprising, for example, a microprocessor (CPU), a memory for storing programs such as an operating system (OS) and application programs, an input device for inputting information, a display device for displaying information, and so on. As the network 18, for instance, FICON (Fibre CONnection; trademark), a fibre channel or the like may be used.

Here, the commands sent from the respective host computers 10, 12 include I/O requests such as read requests and write requests. An I/O request includes, for instance, LUN (Logical Unit Number) and LBA (Logical Block Address) which manage the read-target data. Moreover, a write request that is sent from the respective host computers 10, 12 includes, for instance, the LUN and the LBA to which the write-target data is to be written, as well as the write-target data.

The storage subsystem 14 comprises a plurality of open port packages 20, a plurality of mainframe port packages 22, a drive port package 24, a cache memory 26, a shared memory 28, a switch package 30, a management terminal 32, a storage device 34, and #0 to #3 microprocessor packages (Micro Processor Packages; hereinafter referred to as the "MPPKs") 36, wherein the storage device 34 is configured from a plurality of HDDs (Hard Disk Drives) 38.

Figure 2:
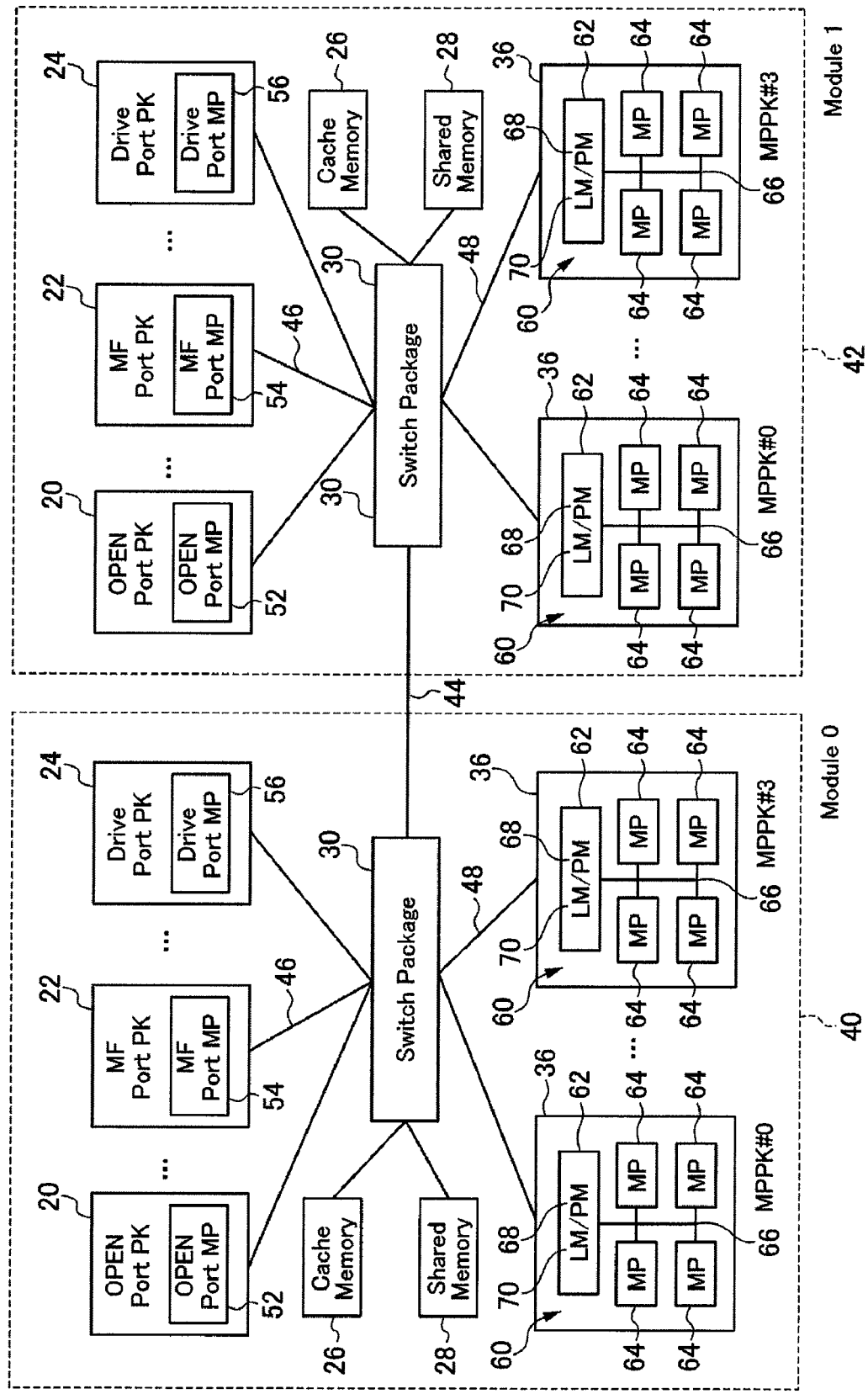
FIG. 2 is a module coupling configuration diagram of the storage subsystem according to an invention of the present invention.

The storage subsystem 14 is configured, as shown in FIG. 2, as #0 module 40 or #1 module 42, and the switch packages 30 in the respective modules 40, 42 are mutually connected via a network 44.

The respective switch packages 30 are connected, via an internal network 46, to the respective open port packages 20, the respective mainframe port packages 22 and the drive port package 24, and are also connected, via an internal network 48, to the #0 to #3 MPPKs 36, and are further connected to the cache memory 26, the shared memory 28 and the management terminal 32. The drive port package 24 is connected, via an internal network 50, to the respective HDDs 38.

The respective open port packages 20 are configured as the channel adapter or the first interface unit by comprising a plurality of ports (not shown) connected to the network 16, and an open port microprocessor (hereinafter referred to as the "open port MP") 52 for performing data access control processing according to commands input from the respective ports.

The open port MP 52 sends and receives information to and from the host computer 10 via the respective ports and the network 16, analyzes the commands input from the respective ports according to a control program, specifies the MPPK 36 to become the transfer destination of the command among a plurality of MPPKs 36, and transfers the command to the specified MPPK 36 via the switch package 30.

Here, the open port MP 52 performs read access from or write access to the cache memory 26, and executes processing for sending the read data or write data existing in the cache memory 26 to the host computer 10.

The respective mainframe port packages 22 are configured as the channel adapter or the first interface unit by comprising a plurality of ports (not shown) connected to the network 18, and a mainframe port microprocessor (hereinafter referred to as the "MF port MP") 54 for performing data access control processing according to commands input from the respective ports.

The MF port MP 54 sends and receives information to and from the host computer 12 via the respective ports and the network 18, analyzes the commands input from the respective ports according to a control program, specifies the MPPK 36 to become the transfer destination of the command among a plurality of MPPKs 36, and transfers the command to the specified MPPK 36 via the switch package 30.

Here, the MF port MP 54 performs read access from or write access to the cache memory 26, and executes processing for sending the read data or write data existing in the cache memory 26 to the host computer 12.

The drive port package 24 is configured as the disk adapter or the second interface unit by comprising a plurality of ports (not shown) connected to the internal network 50, and a drive port microprocessor (hereinafter referred to as the "drive port MP") 56 for performing the I/O processing of data to and from the storage device 34.

In response to a read access or a write access from the open port MP 52 or the MF port MP 54, for instance, the drive port MP 56 reads data from an access-target HDD 38 with the designated HDD 38 in the storage device 34 as the access target, transfers the read data to the open port MP 52 or the MF port MP 54, or writes data into the access-target HDD 38.

Here, allocated to the storage areas of the respective HDDs 38 are a plurality of logical devices (LDEV; Logical DEVices) or a plurality of logical volumes (LV; Logical Volumes) or a plurality of logical units (LU; Logical Units) as a plurality of virtual devices as logical storage devices that can be referred to from the host computers 10, 12. Moreover, if a RAID (Redundant Array of Inexpensive Disks) group is configured from a plurality of HDDs 38, the storage areas of the RAID group can also be used as the storage areas of a plurality of logical devices or a plurality of logical units.

The cache memory 26 is configured as a storage unit for temporarily storing data and the like associated with the processing of the respective port MPs 52, 54, 56.

The shared memory 28 is configured as a storage unit for storing control information that is common to the #0 to #3 MPPKs 36 and information concerning various tables.

The management terminal 32 is configured as a terminal device for inputting information regarding whether the operator will automatically or manually make various settings in the #0 to #3 MPPKs 36 and the like.

The #0 to #3 MPPKs 36 comprise a storage unit 62, and a plurality of microprocessors; for instance, #0 to #3 microprocessors (Micro Processors; hereinafter referred to as the "MPs") 64, and function as the controller 60 to handle the I/O processing of data that is designated in the command. The storage unit 62 and the respective MPs 64 are mutually connected via a bus 66.

The storage unit 62 is configured from a package memory (Package Memory; hereinafter referred to as the "PM") 68, and a local memory (Local Memory; hereinafter referred to as the "LM") 70 provided in correspondence with the respective MPs 64.

The PM 68 is configured as a main memory for storing control information stored in the shared memory, information concerning commands from the respective port MPs 52, 54, and information concerning various tables.

The LM 70 is configured as a storage area for storing data and the like associated with the processing of the respective MPs 64.

Here, the respective MPs 64 access the PM 68 and perform data I/O processing (I/O: INPUT OUTPUT processing) to the respective virtual devices according to the information stored in the PM 68, and store commands, data and the like in the LM 70.

Figure 3:
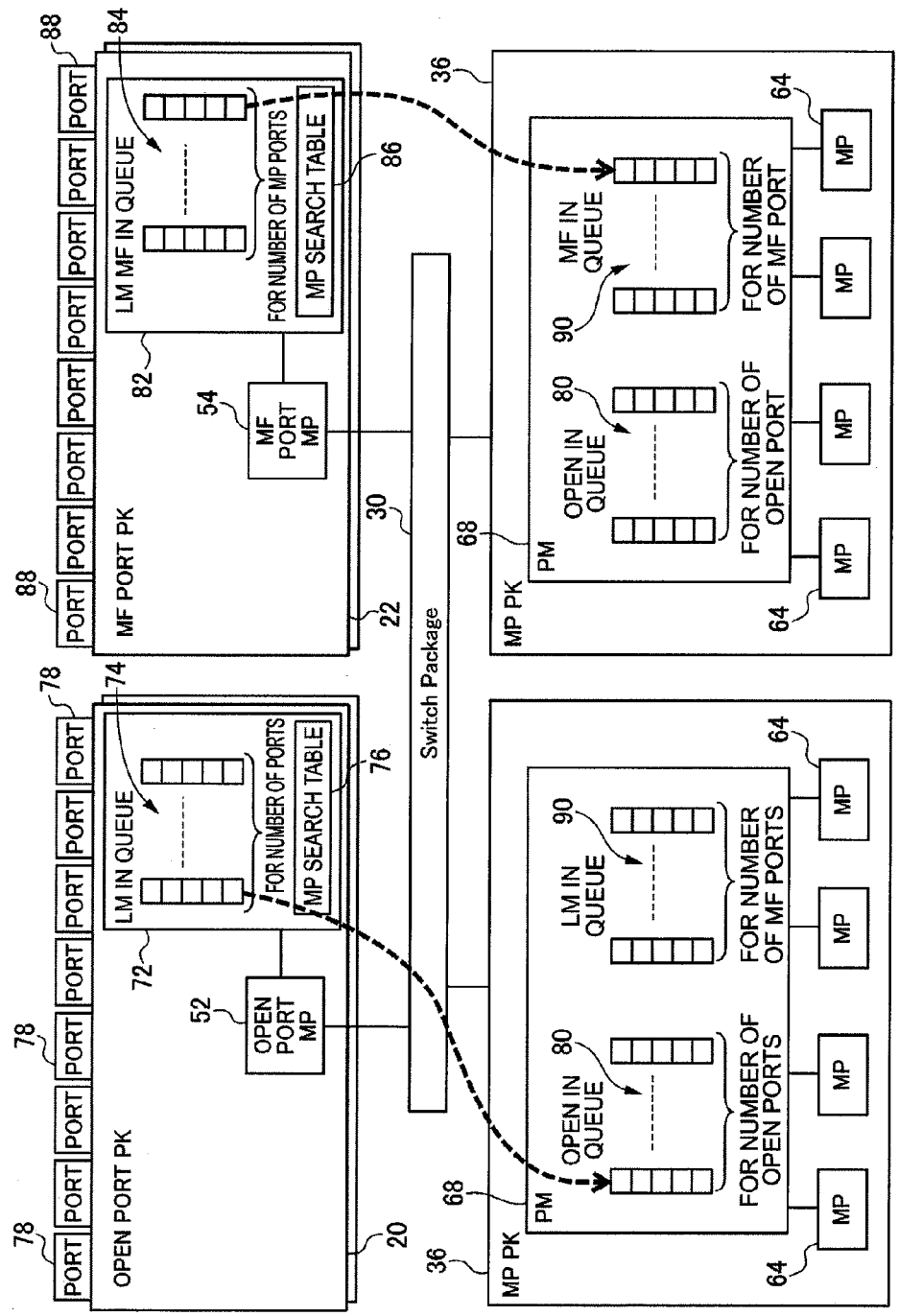
FIG. 3 is a diagram explaining the processing for transferring commands from a port MP to an MPPK.

Meanwhile, as shown in FIG. 3, the local memory 72 of the open port package 20 is provided with an open IN queue 74, and an area for storing information concerning the MP search table 76. The open IN queue 74 is configured as a storage area corresponding to a plurality of ports 78 provided to the open port package 20, and the open IN queue 74 sequentially stores commands received from the respective ports 78 and information concerning such commands.

Here, the open port MP 52 searches the MP search table 76 based on information stored in the open IN queue 74, specifies the MPPK 36 to become the transfer destination of the commands and the like, and transfers such commands and the like to the specified MPPK 36. Here, the MPPK 36 that received the commands and the like stores such commands and the like in the open IN queue 80 of the PM 68.

The open IN queue 80 of the PM 68 is configured as a storage area corresponding to a plurality of ports 78, and the open IN queue 80 sequentially stores commands received by the respective ports 78 and information concerning such commands according to the processing of the open port MP 52.

Similarly, the local memory 82 of the mainframe port package 22 comprises a mainframe IN queue 84 and an MP search table 86. The mainframe IN queue 84 is configured as a storage area corresponding to a plurality of ports 88 provided to the mainframe port package 22, and the mainframe IN queue 84 sequentially stores commands received by the respective ports 88 and information concerning such commands.

Here, the MF port MP 54 searches the MP search table 86 based on information stored in the mainframe IN queue 84, specifies the MPPK 36 to become the transfer destination of the commands and the like, and transfers the commands and the like to the specified MPPK 36. Here, the MPPK 36 that received the commands and the like store such commands and the like in the mainframe IN queue 90 of the PM 68.

The mainframe IN queue 90 of the PM 68 is configured as a storage area corresponding to a plurality of ports 88, and the mainframe IN queue 90 sequentially stores the commands received by the respective ports 88 and information concerning such commands according to the processing of the MF port MP 54.

Figure 4:
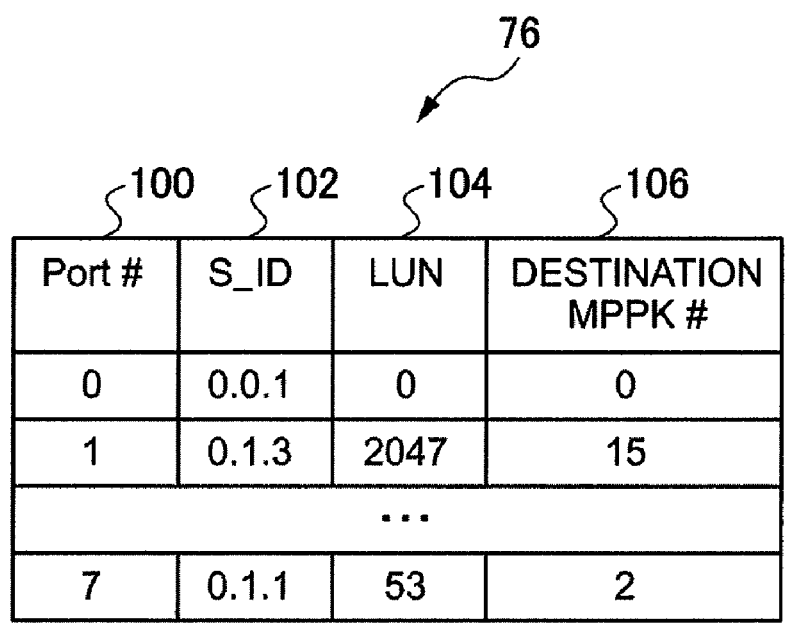
FIG. 4 is a configuration diagram of a host command MP search table.

FIG. 4 shows an example of a host command (standardized command) MP search table 76 to be applied to the open system host computer.

The host command MP search table 76 is configured from a port number 100, a source ID 102, a LUN number 104, and a destination MPPK number 106. The port number 100 stores the number of the respective ports 78, and the source ID 102 stores the number for identifying the host computer 10. The LUN number 104 stores the LUN number that is designated in the command and which is the number to become the data access destination. The destination MPPK number 106 stores the number of the MPPK 36 to become the destination (transfer destination) of information concerning the commands.

Figure 5:
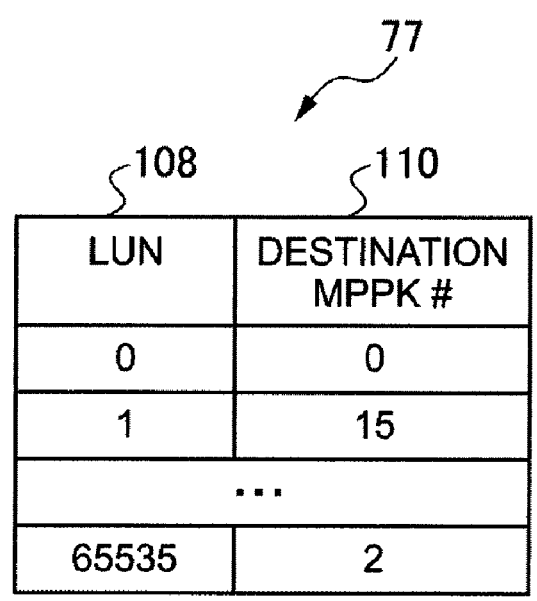
FIG. 5 is a configuration diagram of a vendor-specific command MP search table.

FIG. 5 shows an example of a vendor-specific command (command to be independently prescribed by the respective vendors) search table 77 to be applied to the open system host computer.

The MP search table 77 is configured from a LUN number 108, and a destination MPPK number 110. The LUN number 108 stores the LUN number that is designated in the command and which is the number to become the data access destination. The destination MPPK number 110 stores the number of the MPPK 36 to become the destination (transfer destination) of commands and information concerning such commands. The MP search table 86 may also be configured the same as the MP search table 76.

Figure 6:
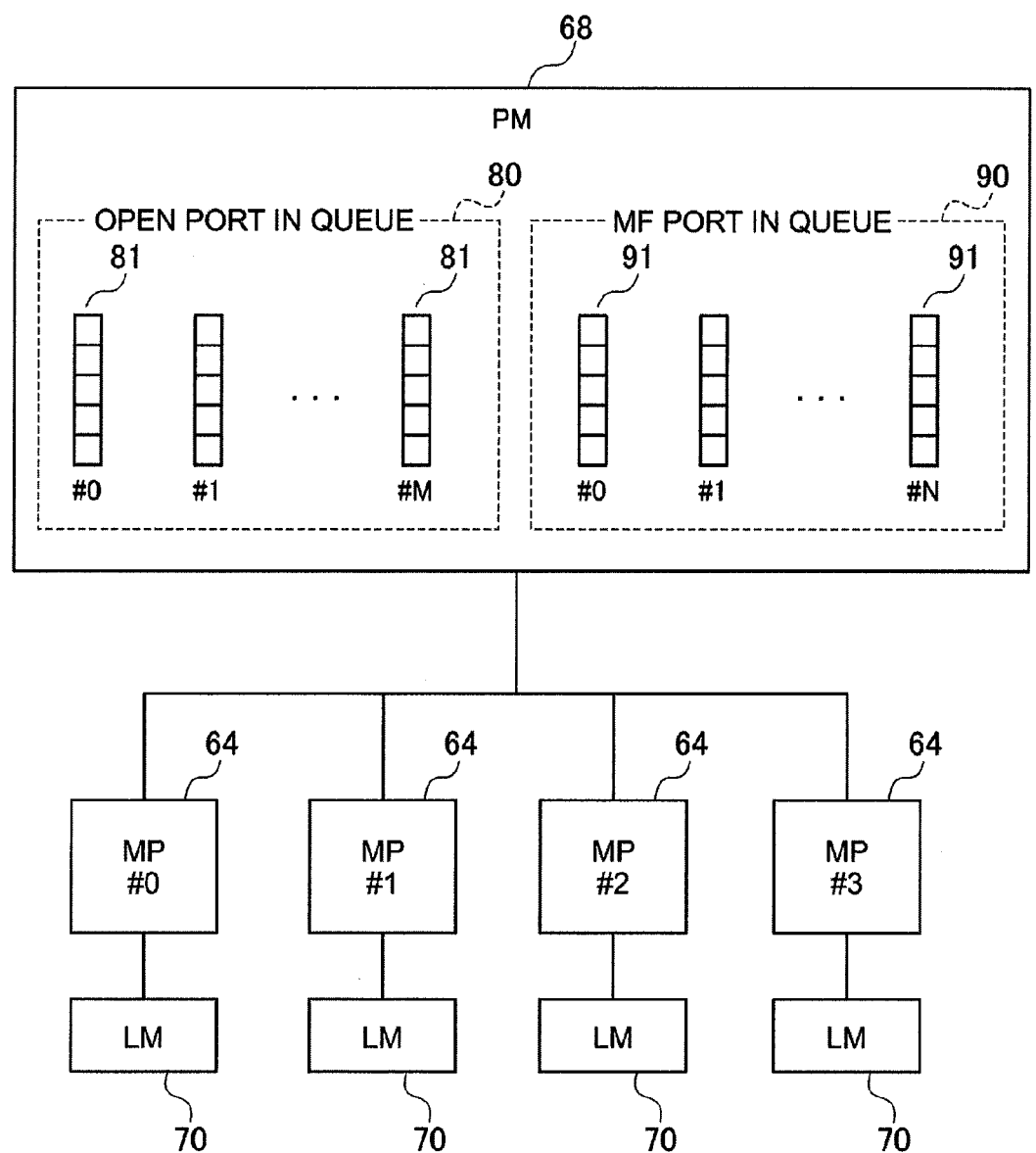
FIG. 6 is a configuration diagram explaining the internal configuration of an MPPK.

Meanwhile, the open IN queue 80 and the mainframe IN queue 90 in the respective PMs 68 comprise, as shown in FIG. 6, queues 81, 91 in a quantity corresponding to the respective ports 78, 88. For example, the open IN queue 80 comprises #0 to #M queues 81 in correspondence with #0 to #M ports 78. The mainframe IN queue 90 comprises #0 to #N queues 91 in correspondence with #0 to #N ports 88.

Here, the respective MPs 64 belonging to the respective MPPKs 36 may access an arbitrary queue 81 in the open IN queue 80 or an arbitrary queue 91 in the mainframe IN queue 90 of the PM 68, and execute the processing of commands and the like stored in the respective queues 81 or the respective queues 91. For example, the respective MPs 64 execute a port scan for accessing the respective queues 81 or the respective queues 91, and execute the processing of commands and the like that were obtained in the port scan.

Figure 7:
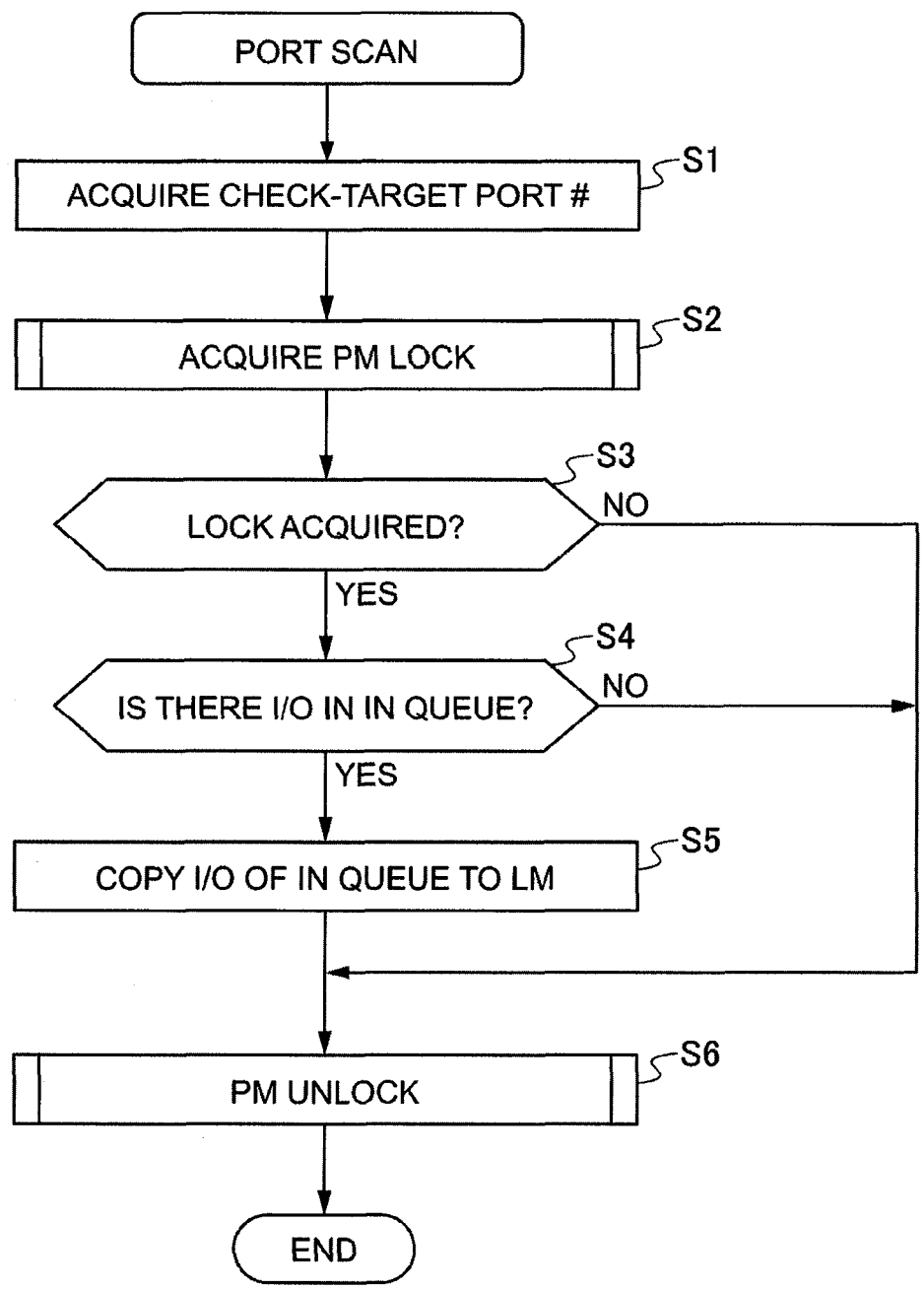
FIG. 7 is a flowchart explaining the basic contents of a port scan.
Figure 8:
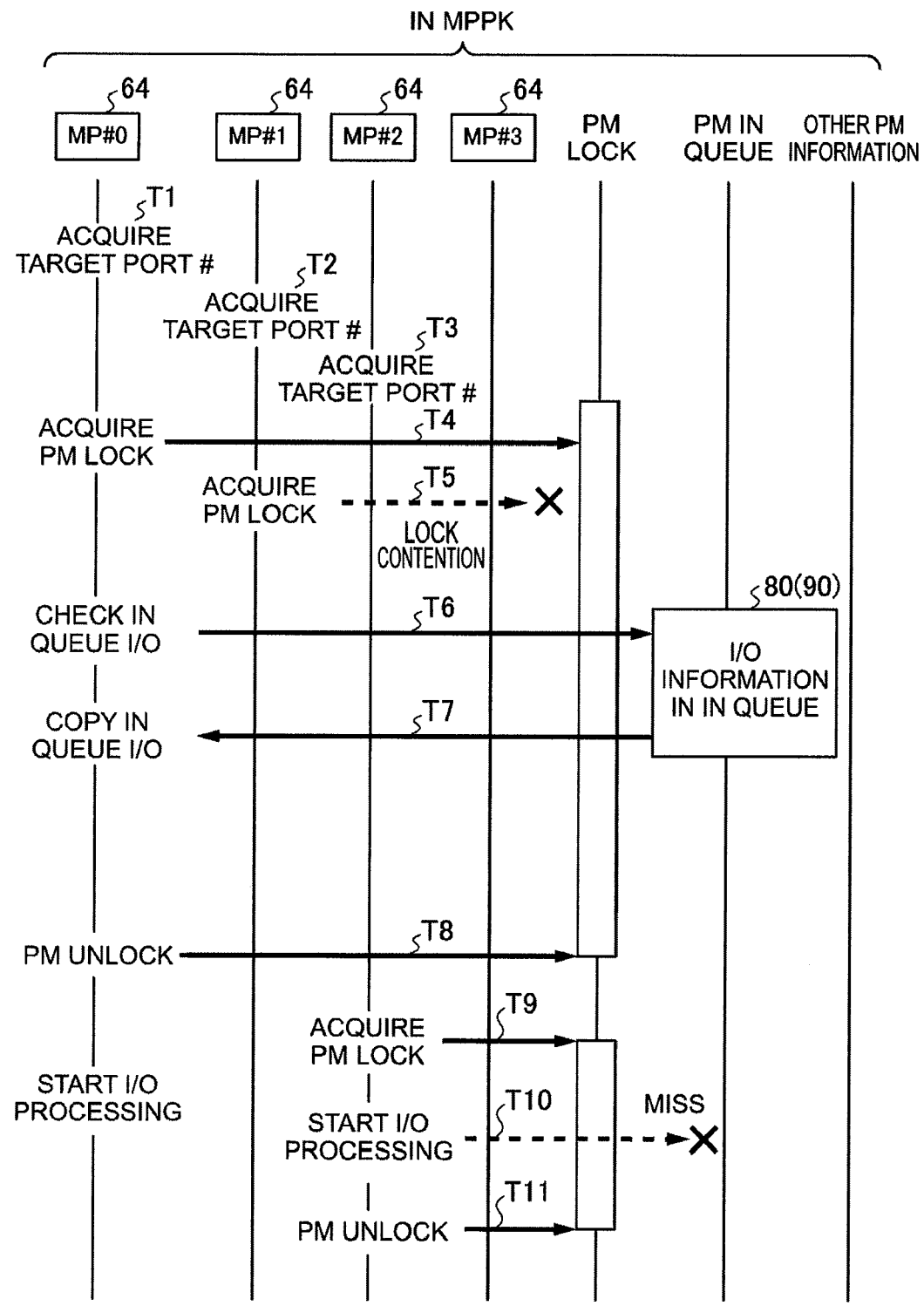
FIG. 8 is a sequence diagram explaining the basic contents of a port scan.

The port scan processing of the respective MPs 64 is now explained with reference to the flowchart of FIG. 7 and the sequence diagram of FIG. 8.

When the respective MPs 64 are to execute, for example, processing concerning a command from the host computer 10, they acquire information concerning a check-target port for accessing the queue 81 corresponding to the respective ports 78 (S1).

For example, the #0 MP 64 accesses the queue 81 corresponding to a check-target port at timing T1 in order to acquire information concerning the check-target port, the #1 MP 64 accesses the queue 81 corresponding to a check-target port at timing T2 in order to acquire information concerning the check-target port, and the #2 MP 64 accesses the queue 81 corresponding to a check-target port at timing T3 in order to acquire information concerning the check-target port.

Subsequently, when the #0 MP 64 accesses the #0 queue 81, for example, it acquires a lock (access right) to the #0 queue 81 at timing T4 (S2). Here, even if the #1 MP 64 accesses the #0 queue 81 at timing T5 and attempts to acquire a lock to the #0 queue 81, a lock contention will occur with the #0 MP 64.

Thereafter, the #0 MP 64 determines whether the lock was acquired (S3), and proceeds to the processing of step S6 when the lock could not be acquired, and checks whether there is I/O (INPUT OUTPUT) information (information concerning the I/O processing) in the #0 queue 81 at timing T6 when the lock was acquired (S4).

Here, the #0 MP 64 proceeds to the processing of step S6 if there is no I/O information in the #0 queue 81, and copies the I/O information in the #0 queue 81 to the local memory 70 at timing T7 if there is I/O information in the #0 queue 81 (S5), unlocks the PM 68 at timing T8 since the processing to the #0 queue 81 has ended (S6), and thereby ends the processing in this routine.

Thereafter, the #0 MP 64 starts the I/O processing based on the I/O information stored in the local memory 70. Incidentally, when the #2 MP 64 acquires a lock to the PM 68 at timing T9 and subsequently accesses the queue 81 corresponding to the check-target port at timing T10 but there is no I/O information in the queue 81 of the access destination, this will result in the miss of a port event, and the PM 68 will be unlocked at timing T11.

Here, a port event refers to information such as a command, a new I/O, or a transfer completion notice being input into the open IN queue 80 or the mainframe IN queue 90 via the ports 78, 88, and a miss of a port event means a state where there is no information such as a command, a new I/O, or a transfer completion notice in the queue 81 of the open IN queue 80 or the queue 91 of the mainframe IN queue 90.

Figure 9:
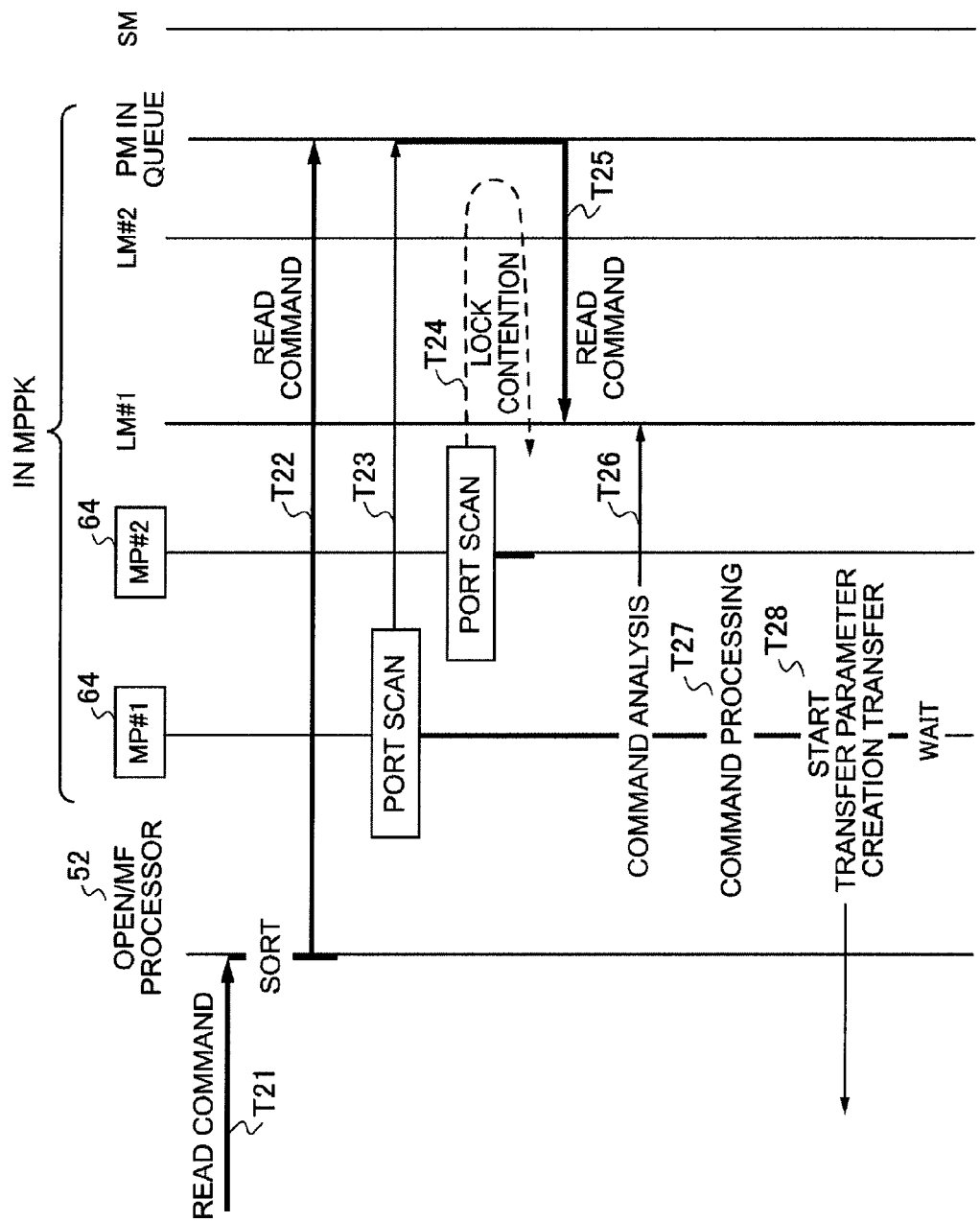
FIG. 9 is a sequence diagram explaining the processing of the first half of the read processing.

The sequence of read processing is now explained with reference to FIG. 9 and FIG. 10. Incidentally, although the source of the command is the host computer 10 in the following processing, the source of the command may also be the host computer 12.

Foremost, when the open port MP 52 receives a read command from the host computer 10 at timing T21, the open port MP 52 searches the MP search table 76 based on the received read command, specifies the MPPK 36 of the transfer destination according to the read command, and transfers the read command to the PM 68 of the specified MPPK 36 at timing T22.

For instance, when the open port MP 52 receives a read command as a data I/O request to one virtual device (for instance, one logical unit) among a plurality of virtual devices from the host computer 10, it specifies the controller 60 to handle the read processing to the one virtual device among a plurality of controllers 60 based on the read command, and transfers the read command of the MPPK 36 of the transfer destination with the MPPK 36 to which the specified controller 60 belongs as the transfer destination.

Here, in the MPPK 36 that received the read command, the respective MPs 64 are asynchronously performing a port scan to the PM 68. For example, the #1 MP 64 starts the port scan to the PM 68 at timing T23, and searches for the #1 queue 81. Here, when the #2 MP 64 starts the port scan to PM 68 at timing T24 and accesses the #1 queue 81 of the PM 68, the #2 MP 64 will be subject to a lock contention with the #1 MP 64.

Meanwhile, after the #1 MP 64 implements a port scan to the #1 queue 81 and acquires a lock to the #1 queue 81, if there is a read command in the #1 queue 81, a read command is stored in the #1 LM 70 at timing T25.

Subsequently, the #1 MP 64 reads the read command stored in the #1 LM 70 and analyzes the command at timing T26. Thereafter, the #1 MP 64 accesses the control information stored in the PM 68 and starts the command processing according to the read command at timing T27.

For example, the #1 MP 64 determines whether the read data designated in the read command exists in the cache memory 26 based on the control information stored in the PM 68 and, when the read data exists in the cache memory 26, considers this to be a "hit" and performs processing to the open port MP 52 with the read data existing in the cache memory 26 as the access destination. In the foregoing case, the open port MP 52 reads the read data existing in the cache memory 26 and transfers it to the host computer 10.

Meanwhile, if the read data does not exist in the cache memory 26, the #1 MP 64 considers this to be "miss" and commands the drive port MP 56 to perform read access to one virtual device. In the foregoing case, the drive port MP 56 transfers the read data that was obtained from the read access to the one virtual device to the cache memory 26. Thereafter, the open port MP 52 reads the read data from the cache memory 26 and transfers it to the host computer 10, or transfers the read data that was transferred from the drive port MP 56 to the host computer 10.

Subsequently, at timing T28, the #1 MP 64 creates the result of the command processing as a transfer parameter, transfers the created transfer parameter to the open port MP 52, starts up the transfer process in the open port MP 52 for transferring the transfer parameter to the host computer 10, and subsequently enters the processing wait condition.

Figure 10:
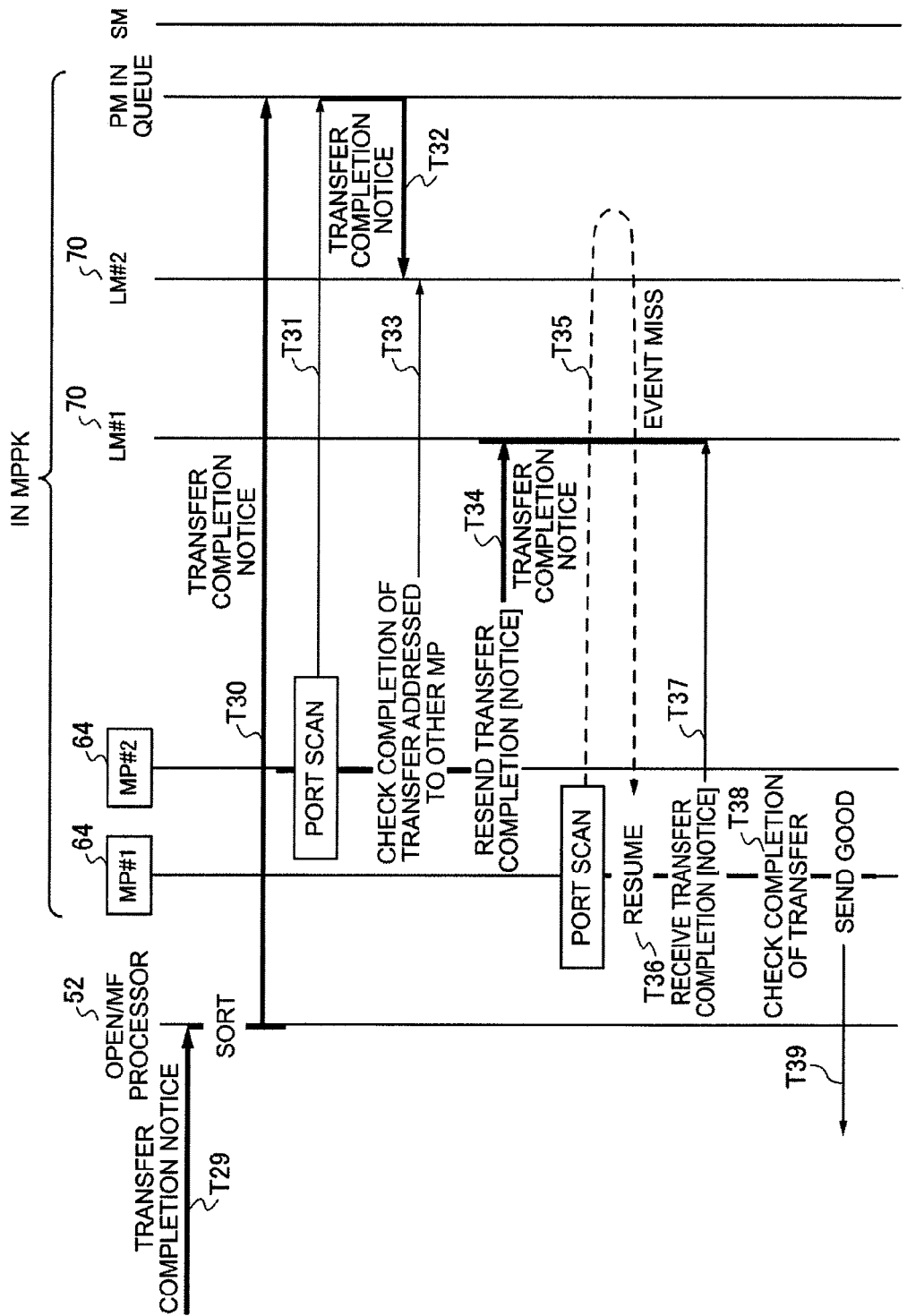
FIG. 10 is a sequence diagram explaining the processing of the second half of the read processing.

Subsequently, as shown in FIG. 10, if a transfer completion notice is input into the open port MP 52 a timing T29 while the #1 MP 64 is in the processing wait condition, the open port MP 52 specifies the MPPK 36 to which the MP 64 that created the transfer parameter at timing T28 belongs based on the transfer completion notice, and sends the transfer completion notice to the specified MPPK 36 at timing T30. This transfer completion notice is stored in the #1 queue 81 among the open IN queues 80 of the MPPK 36 that was specified with the open port MP 52.

Subsequently, when the #2 MP 64 performs a port scan to the PM 68 and accesses the #1 queue 81 among the open IN queues 80 at timing T31, the #2 MP 64 stores the transfer completion notice, as information that was stored in the #1 queue 81, in the #2 LM 70 at timing T32.

At timing T33, when the #2 MP 64 accesses the #2 LM 70 and checks that the transfer completion notice existing in the #2 LM 70 is the transfer completion notice to the #1 MP 64, the #2 MP 64 considers this to be the re-sending of the transfer completion notice and returns the transfer completion notice, which is addressed to the #1 MP 64, to the #1 LM 70 at timing T34.

Meanwhile, at timing T35, when the #1 MP 64 performs a port scan to the PM 68 and accesses the #1 queue 81 and a transfer completion notice does not exist in the #1 queue 81, the #1 MP 64 considers to be a miss of a port event, and resumes the processing at timing T36.

The #1 MP 64 that resumed the processing accesses the #1 LM 70 at timing T37 and, upon receiving a transfer completion notice, checks the transfer completion notice at timing T38. Here, if the transfer completion notice is determined to be a transfer completion notice to the #1 MP 64, the #1 MP 64 considers that one I/O processing (job) ended in a favorable state at timing T39, sends GOOD as a response showing a favorable state to the open port MP 52 at timing T39, and thereby ends the read processing.

Figure 11:
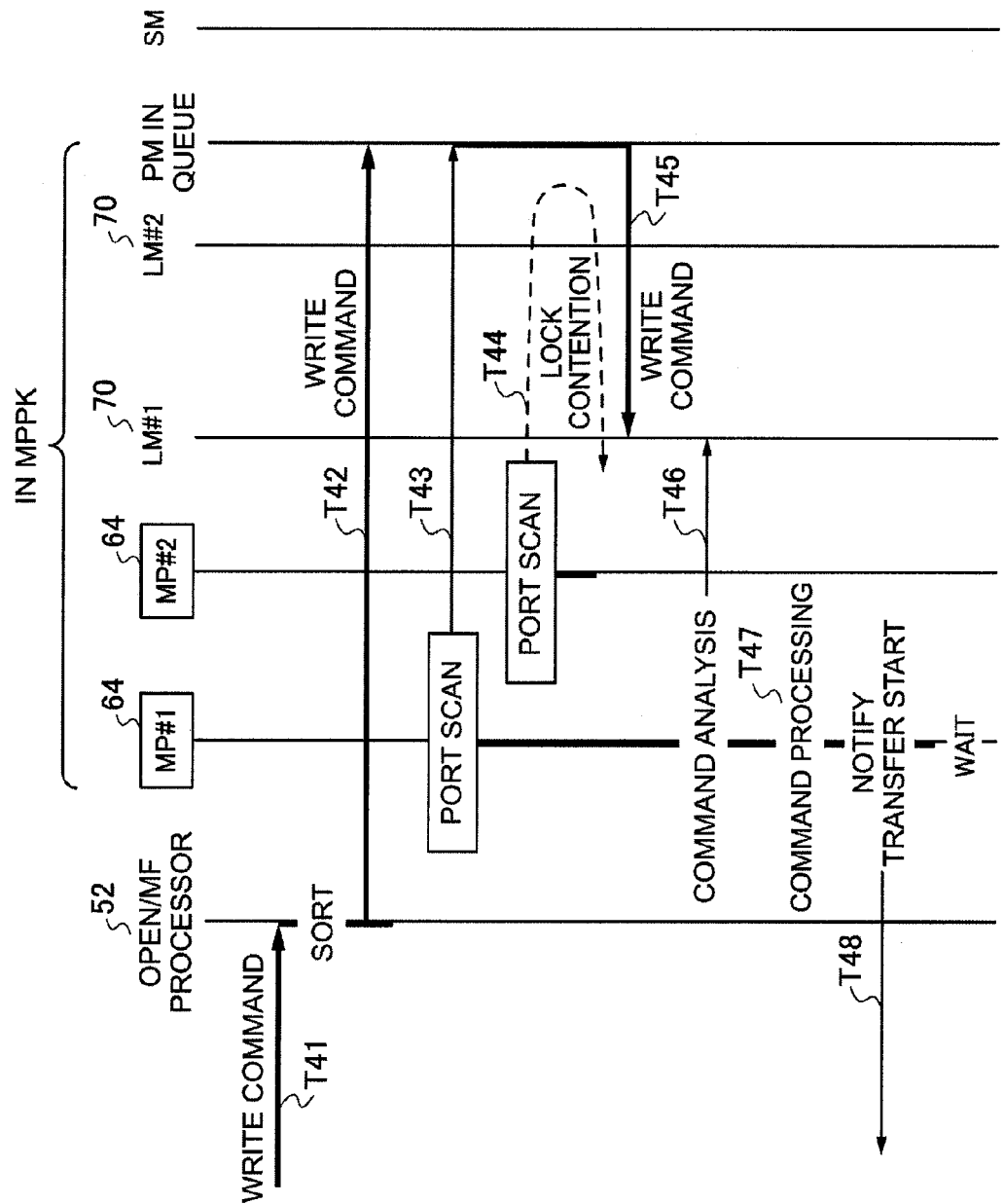
FIG. 11 is a sequence diagram explaining the processing of the first half of the write processing.

The sequence of write processing is now explained with reference to FIG. 11 and FIG. 12. Incidentally, although the source of the command is the host computer 10 in the following processing, the source of the command may also be the host computer 12.

Foremost, when the open port MP 52 receives a write command from the host computer 10 at timing T41, the open port MP 52 searches the MP search table 76 based on the received write command, specifies the MPPK 36 of the transfer destination according to the write command, and transfers the write command to the PM 68 of the specified MPPK 36 at timing T42.

For instance, when the open port MP 52 receives a write command as a data I/O request to one virtual device (for instance, one logical unit) among a plurality of virtual devices from the host computer 10, it specifies the controller 60 to handle the write processing to the one virtual device among a plurality of controllers 60 based on the write command, and transfers the write command of the MPPK 36 of the transfer destination with the MPPK 36 to which the specified controller 60 belongs as the transfer destination.

Here, in the MPPK 36 that received the write command, the respective MPs 64 are asynchronously performing a port scan to the PM 68. For example, the #1 MP 64 starts the port scan to the PM 68 at timing T43, and searches for the #1 queue 81. Here, when the #2 MP 64 starts the port scan to PM 68 at timing T44 and accesses the #1 queue 81 of the PM 68, the #2 MP 64 will be subject to a lock contention with the #1 MP 64.

Meanwhile, after the #1 MP 64 implements a port scan to the #1 queue 81 and acquires a lock to the #1 queue 81, if there is a write command in the #1 queue 81, a write command is stored in the #1 LM 70 at timing T45.

Subsequently, the #1 MP 64 reads the write command stored in the #1 LM 70 and analyzes the command at timing T46. Thereafter, the #1 MP 64 accesses the control information stored in the PM 68 and starts the command processing according to the write command at timing T47.

For example, the #1 MP 64 determines whether an area for storing the write data designated in the write command exists in the cache memory 26 based on the control information stored in the PM 68 and, when an area for storing the write data exists in the cache memory 26, performs processing to the open port MP 52 with the cache memory 26 as the access destination of the write data. In the foregoing case, the open port MP 52 stores the write data that was transferred from the host computer 10 in the cache memory 26. The write data stored in the cache memory 26 is subsequently stored in one virtual device by the drive port MP 56.

Meanwhile, if the area for storing the write data does not exist in the cache memory 26, the #1 MP 64 commands the drive port MP 56 to output data in the cache memory 26 to one virtual device, and form an unused area in the cache memory 26. Subsequently, the open port MP 52 stores the write data that was transferred from the host computer 10 in the unused area of cache memory 26.

Subsequently, at timing T48, the #1 MP 64 creates the result of the command processing as a transfer parameter, transfers the created transfer parameter to the open port MP 52, starts up the transfer process in the open port MP 52 for transferring the transfer parameter to the host computer 10, and subsequently enters the processing wait condition.

Figure 12:
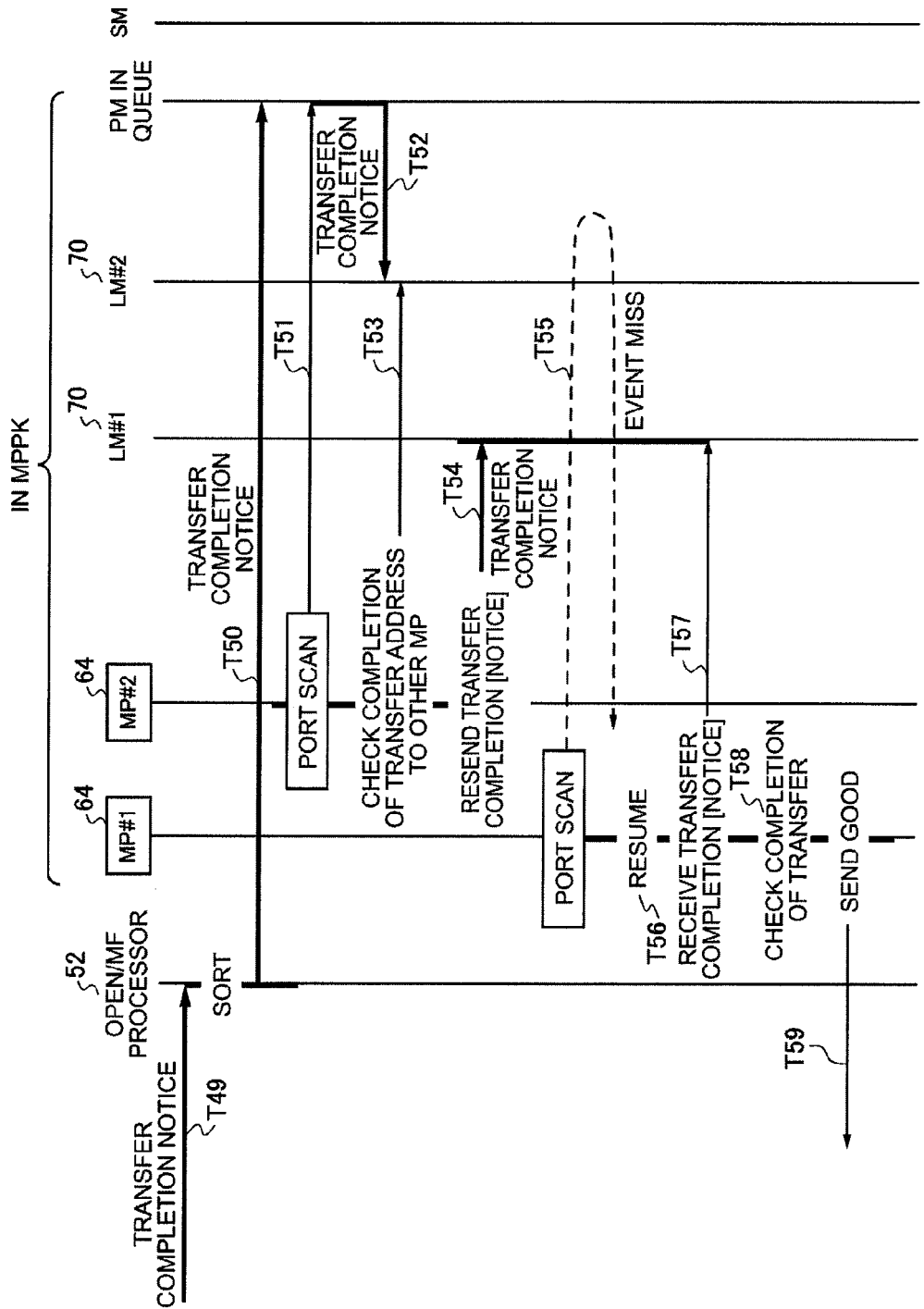
FIG. 12 is a sequence diagram explaining the processing of the second half of the write processing.

Subsequently, as shown in FIG. 12, if a transfer completion notice is input into the open port MP 52 a timing T49 while the #1 MP 64 is in the processing wait condition, the open port MP 52 specifies the MPPK 36 to which the MP 64 that created the transfer parameter at timing T48 belongs based on the transfer completion notice, and sends the transfer completion notice to the specified MPPK 36 at timing T50. This transfer completion notice is stored in the #1 queue 81 among the open IN queues 80 of the MPPK 36 that was specified with the open port MP 52.

Subsequently, when the #2 MP 64 performs a port scan to the PM 68 and accesses the #1 queue 81 among the open IN queues 80 at timing T51, the #2 MP 64 stores the transfer completion notice, as information that was stored in the #1 queue 81, in the #2 LM 70 at timing T52.

At timing T53, when the #2 MP 64 accesses the #2 LM 70 and checks that the transfer completion notice existing in the #2 LM 70 is the transfer completion notice to the #1 MP 64, the #2 MP 64 considers this to be the re-sending of the transfer completion notice and returns the transfer completion notice, which is addressed to the #1 MP 64, to the #1 LM 70 at timing T54.

Meanwhile, at timing T55, when the #1 MP 64 performs a port scan to the PM 68 and accesses the #1 queue 81 and a transfer completion notice does not exist in the #1 queue 81, the #1 MP 64 considers to be a miss of a port event, and resumes the processing at timing T56.

The #1 MP 64 that resumed the processing accesses the #1 LM 70 at timing T57 and, upon receiving a transfer completion notice, checks the transfer completion notice at timing T58. Here, if the transfer completion notice is determined to be a transfer completion notice to the #1 MP 64, the #1 MP 64 considers that one I/O processing (job) ended in a favorable state at timing T59, sends GOOD as a response showing a favorable state to the open port MP 52 at timing T59, and thereby ends the write processing.

When the respective MPs 64 are to perform the read processing or the write processing, if a port scan is performed by a plurality of MPs 64 to the same queue 81 or the same queue 91, a lock contention may occur. This lock contention increases in proportion to the increase in the number of MPs 64 belonging to the respective MPPKs 36, and the lock contention will increase the I/O processing time.

Moreover, if a port scan is performed by a plurality of MPs 64 to the same queue 81 or the same queue 91, information associated with the port event such as the transfer completion notice may be acquired by another MP 64, and a miss of the port event may occur. This miss of a port event increases in proportion to the increase in the number of MPs 64 belonging to the respective MPPKs 36, and increase the I/O processing time.

Thus, in this example, as shown below, a port without any port event (ports in which information such as a command or a transfer completion notice has not been input) among a plurality of ports 78, 88 is excluded from the ports to be checked of the respective port MPs 52, 54.

For example, the queue 81 or the queue 91 corresponding to the port without any port event is excluded from the check-target queue as the check-target queue (search target) of the MP 64 belonging to the respective MPPKs 36.

Here, the respective MPs 64 of the respective controllers 60 may execute a port scan with a queue corresponding to a predetermined port as the check-target port among the respective queues 81, 92 belonging to the PM (main memory) 68 as the search target and, upon obtaining a command (I/O request) based on the execution of the foregoing port scan, may execute data I/O processing to one virtual device as the processing of the command (I/O request) that was input into the port corresponding to the queue storing such command (I/O request).

Moreover, the respective MPs 64 belonging to the respective controllers 60 may execute a port scan with a queue corresponding to a port to which the virtual device is allocated in advance among the respective queues 81, 91 belonging to the PM (main memory) 68 as a search target and, upon obtaining a command (I/O request) as a result of executing the port scan, may execute data I/O processing to one virtual device as the processing of the command (I/O request) that was input into the port corresponding to the queue storing that command (I/O request).

Further, the respective MPs 64 belonging to the respective controllers 60 may execute a port scan with a queue corresponding to a port other than ports that have not received a command (I/O request) for a given period of time among the respective queues 81, 91 belonging to the PM (main memory) 68 as a search target and, upon obtaining the command (I/O request) as a result of executing the port scan, may execute data I/O processing to one virtual device as the processing of the command (I/O request) that was input into the port corresponding to the queue storing that command (I/O request).

In addition, the respective MPs 64 belonging to the respective controllers 60 may execute, with a queue corresponding to a predetermined port as a check-target port among the respective queues 81, 91 belonging to the PM (main memory) 68 as a search-target queue, a port scan against the search-target queue and, upon obtaining a command (I/O request) as a result of executing the port scan, may execute processing of the command (I/O request) input into the port corresponding to the queue storing that command (I/O request), update the search-target queue by excluding a queue in which the command (I/O request) does not exist from the search-target queue by executing the port scan among the search-target queues, and execute the port scan against the updated search-target queue in the subsequent port scans.

As described above, as a result of the respective MPs 64 belonging to the respective controllers 60 executing a port scan with only the queue corresponding to a specified port among the respective queues 81, 91 belonging to the PM (main memory) 68 as the search target, the number of queues 81, 91 as the search target of the respective MPs 64 will decrease, whereby information such as the command (I/O request) stored in the respective queues 81, 91 can be searched quickly.

Moreover, in the ensuing example, since the correspondence of the MP 64 belonging to the respective MPPKs 36 and the port 78 or the port 88; specifically, the correspondence of the respective MPs 64 belonging to the respective MPPKs 36 and the respective queues 81 or the respective queues 91 is dynamically switched based on the load information of the respective MPs 64, an exclusive mode or a share mode is adopted as the processing mode concerning the information input into the respective ports 78, 88, and the I/O processing is executed according to such exclusive mode or share mode.

For example, upon accessing the respective queues 81 or the respective queues 91, the respective MPs 64 belonging to the respective MPPKs 36 may select the exclusive mode as the processing of the command (I/O request) input into the respective ports 78 or ports 88 upon obtaining load information showing a low load condition as the load information, and select the share mode as the processing of the command (I/O request) input into the respective ports 78 or ports 88 upon obtaining load information showing a high load condition as the load information.

Moreover, the respective MPs 64 belonging to the respective MPPKs 36 may measure, for each set time, the processing time required for processing the command (I/O request) input into the respective ports 78 or ports 88, sequentially update each of the measurements, compare each of the updated measurements and a threshold upon receiving the command (I/O request), select the exclusive mode as the processing of the command (I/O request) input into the respective ports 78 or ports 88 upon obtaining, based on the comparative result, load information in which the processing time required for processing the command (I/O request) is lower than the threshold as the load information concerning the respective ports 78 or ports 88, and select the share mode as the processing of the command (I/O request) input into the respective ports 78 or ports 88 upon obtaining, based on the comparative result, load information in which the processing time required for processing the command (I/O request) exceeds the threshold value as the load information concerning the respective ports 78 or ports 88.

Further, the respective MPs 64 belonging to the respective MPPKs 36 may calculate an MP utilization ratio (microprocessor utilization ratio) associated with the processing of the command (I/O request) input into the respective ports 78 or ports 88, respectively calculate a port utilization ratio concerning the respective ports 78 or ports 88 based on the calculated microprocessor utilization ratio, determine the high or low of each of the calculated microprocessor utilization ratios upon receiving the command (I/O request), select the exclusive mode as the processing of the command (I/O request) input into the respective ports 78 or ports 88 upon obtaining, based on the determination result, load information in which the calculated port utilization ratio shows a low value as the load information concerning the respective ports 78 or ports 88, and select the share mode as the processing of the command (I/O request) input into the respective ports 78 or ports 88 upon obtaining, based on the determination result, load information in which the calculated port utilization ratio shows a high value as the load information concerning the respective ports 78 or ports 88.

Here, the exclusive mode is a mode where one MP 64 exclusively performs the I/O processing such as processing concerning information input into one port 78 or port 88; specifically, it is a mode where one MP 64 exclusively performs the I/O processing such as processing concerning information stored in one queue 81 or queue 91.

Meanwhile, the share mode is a mode where a plurality of MPs 64 share the I/O processing such as processing such as processing concerning information input into one port 78 or port 88; specifically, it is a mode where a plurality of MPs 64 share the I/O processing such as processing concerning information stored in one queue 81 or queue 91.

Moreover, the MP utilization ratio (microprocessor utilization ratio) shows the utilization factor of the MP 64 per unit time, and the port utilization ratio shows the value obtained by breaking down the MP utilization ratio based on the granularity of each port 78 or port 88.

When using the exclusive mode, the respective MPs 64 belonging to the respective controllers 60 are able to reduce the number of queues (number of ports) to be checked by executing a port scan with only the queue corresponding to a specified port among the respective queues 81, 91 belonging to the PM (main memory) 68 as the search target, and additionally prevent the occurrence of a lock contention. The respective MPs 64 are also able to prevent other MPs 64 from acquiring information concerning port events that are required for the processing in the self-MP 64.

Nevertheless, when using the exclusive mode, the I/O processing performance regarding one port (I/O processing performance regarding one queue) will reach its limit at the processing capacity of one MP 64. In the foregoing case, the throughput will deteriorate. Moreover, if the MP 64 malfunctions, it is necessary to give consideration to the fact that the processing that was handled by such malfunctioned MP 64 can no longer be executed if not action is taken.

Meanwhile, when the I/O processing is performed with the share mode, since the respective MPs 64 belonging to the respective controllers 60 will share the I/O processing concerning one queue (one port) with a plurality of MPs 64, the I/O processing performance will be higher in comparison to the I/O processing with the exclusive mode.

Nevertheless, if the respective MPs 64 belonging to the respective controllers 60 use the share mode, the overhead may increase pursuant to lock contentions. It is also necessary to give consideration so that another MP 64 will not acquire information concerning the port events that are required in the I/O processing of the self-MP 64, and that the response time will be delayed pursuant to the increase in overhead.

Figure 15:
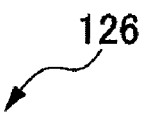
FIG. 15 is a configuration diagram of a port scan bitmap table to be used in the port scan.
Figure 16:
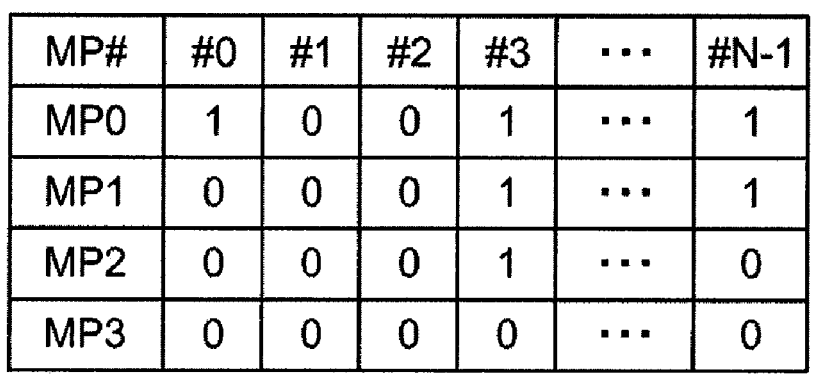
FIG. 16 is a configuration diagram of an event bitmap table to be used in the port scan.

Upon excluding a port without any port event among the ports 78, 88 from the check-target port, as described later, the master bitmap tables 120, 124 (refer to FIG. 13, FIG. 14), the port scan bitmap table 126 (refer to FIG. 15), the event bitmap table 128 (refer to FIG. 16), and the LDEV-port correspondence table 130 (refer to FIG. 17) are used. Further, upon dynamically switching the correspondence of the respective MPs 64 and the ports 78, 88, the port utilization ratio table 140 (refer to FIG. 23) and the port utilization ratio-MP quantity correspondence table 146 (refer to FIG. 24) are used.

Here, an LDEV-port correspondence table (virtual device/port correspondence table) 130 which prescribes the relationship of the respective virtual devices (LDEVs) and the respective ports based on an LDEV-MPPK (virtual device/controller correspondence table) 136 which defines the relationship of the virtual device (LDEV), which is to be managed by the respective MPPKs (controllers) 36, and the respective MPPKs (controllers) 36 is created, a master bitmap table 124 in which ports to be subject to a port scan among a plurality of ports are allocated to the respective MPs 64 is created based on the LDEV-port correspondence table 130, and a port scan bitmap table 126 in which ports to be subject to a port scan among a plurality of ports are allocated to the respective MPs 64 is created based on the master bitmap table 124.

In the foregoing case, the respective MPs 64 detect the status of a port event by performing a port scan to the ports that are to be subject to a port scan according to the port scan bitmap table 126, creates an event bitmap table 128 in which ports with a port event detected in the port scan are allocated to the respective MPs 64, reflects the contents of the event bitmap table 128 in the port scan bitmap table 126, performs a port scan to ports to be subject to a port scan according to the port scan bitmap table 126 with the contents of the event bitmap table 128 reflected therein, and thereby executes the I/O processing. The specific contents are explained below.

FIG. 13 shows an example of the master bitmap table 120. The master bitmap table 120 is a bitmap table showing the check-target port of the respective MPs 64, and is configured from an MP number 122, and #0 to #N−1 port numbers 123.

The entry of the MP number 122 stores the number of the #0 to #3 MPs 64, and the entry of the respective port numbers 123 stores information of "1" or "0" as the bitmap concerning the #0 to #3 MPs 64. Incidentally, the lowermost entry stores the number of processing MPs in correspondence with the respective port numbers 123.

Here, as the bitmap concerning the #0 to #3 MPs 64, in the respective port numbers 123, "1" is stored for the check-target ports of the respective MPs 64, and "0" is stored for ports that are excluded from the ports to be checked of the respective MPs 64.

In the example of FIG. 13, the #0 MP 64 has the port of the #0 port number 123 as the check-target port, the #1 MP 64 has the port of the #1 port number 123 as the check-target port, and the #2 MP 64 has the port of the #2 port number 123 as the check-target port. Moreover, the #0 to #2 MPs 64 respectively have the port corresponding to the #3 port number 123 as the check-target port. The #0 and #1 MPs 64 have the port corresponding to the #N−1 port number 123 as the check-target port.

Specifically, the ports corresponding to the #0 to #2 port numbers 123 become exclusive ports in which only one MP 64 performs the processing, and the ports corresponding to the #3 and #N−1 port numbers 123 become shared ports in which two or more MPs 64 handle the processing.

Figure 14:
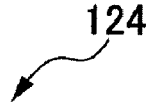
FIG. 14 is a configuration diagram of a master bitmap table to be used in the port scan.

Here, if a part of the master bitmap table 120 is omitted, then it can be represented as the master bitmap table 124 as shown, for example, in FIG. 14. The port scan bitmap table 126 shown in FIG. 15 can be created from this master bitmap table 124.

The port scan bitmap table 126 is created by copying the contents of the master bitmap table 124, and is used for the respective MPs 64 to perform a port scan to the queue 81 or the queue 91 corresponding to the #0 to #N−1 ports, and detect a port event such as a new I/O or a transfer completion notice.

Specifically, the port scan bitmap table 126 is configured as a bitmap table to be used when the respective MPs 64 are to perform a port scan. When the respective MPs 64 perform a port scan according to the port scan bitmap table 126 and detect a port event, the detection result is reflected in the event bitmap table 128 shown in FIG. 16.

The event bitmap table 128 is a table for recording the detection status of port events, and is a bitmap table for recording the ports in which the respective port events were detected when the respective MPs 64 detect such port events.

Here, before the respective MPs 64 start a port event, all bits of the event bitmap table 128 are "0." When the respective MPs 64 perform a port scan according to the port scan bitmap table 126 and no port event is detected in the port corresponding to the queue 81 or the queue 91, the bits of the event bitmap table 128 are still "0." However, if a port event is detected in the port corresponding to the queue 81 or the queue 91, the bits of the port in which a port even was detected will be inverted from "0" to "1" in the event bitmap table 128.

For example, when the #1 MP 64 performs a port scan to the #1 port according to the port scan bitmap table 126 and the #2 MP 64 performs a port scan to the #2 port according to the port scan bitmap table 126, and no port event is detected in the #1 port and the #2 port, the bits of the #1 port corresponding to the #1 MP 64 and the bits of the #1 port corresponding to the #2 MP 64 will respectively be "0" in the event bitmap table 128.

Meanwhile, when the #0 MP 64 performs a port scan to the #0 port according to the port scan bitmap table 126, the #0 to #2 MPs 64 perform a port scan to the #3 port according to the port scan bitmap table 126, and the #0 to #1 MPs 64 perform a port scan to the #N−1 port according to the port scan bitmap table 126, and a port event is detected in the respective ports, the bits of the #0 port corresponding to the #0 MP 64, the bits of the corresponding to the #0 to #2 MPs 64, and the bits of the #N−1 port corresponding to the #0 to #1 MPs 64 will respectively be inverted from "0" to "1" in the event bitmap table 128.

As described above, as a result of storing the bit information of "1" in the event map table 128 for ports in which a port event was detected and storing the bit information of "0" in the event map table 128 for ports in which a port event was not detected, the ports without any port event can be excluded from the ports to be checked.

Specifically, after performing a port scan using the port scan bitmap table 126 and reflecting the detection status of a port event in the event bitmap table 128, as a result of performing a port scan using the event bitmap table 128 with the detection status of the port event reflected therein in the subsequent port scans, the respective MPs 64 are able to omit the port scan of ports storing the bit information of "0" regarding the respective ports.

Figure 17:
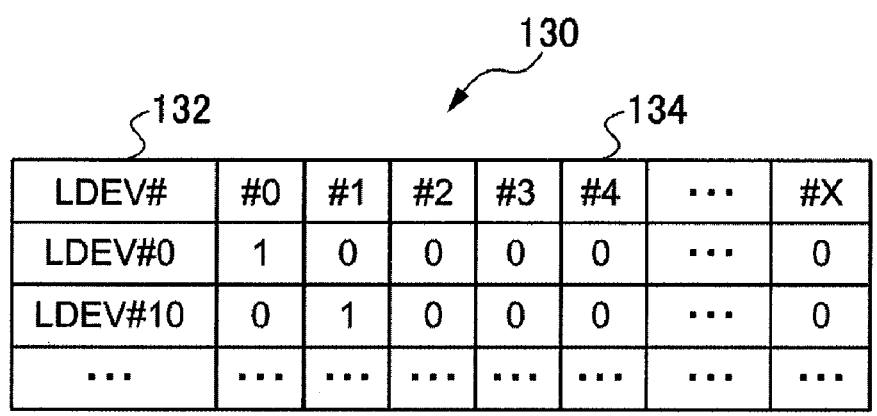
FIG. 17 is a configuration diagram of an LDEV-port correspondence table.

An example of the LDEV-port correspondence table 130 is shown in FIG. 17. The LDEV-port correspondence table 130 is a table showing the list of ports in which the respective LDEVs are LU-defined, and is used for excluding the ports in which the respective LDEVs are not LU-defined from the check-target port.

The LDEV-port correspondence table 130 is configured from an LDEV number 132, and #0 to #X port numbers 134. The LDEV number 132 stores the LDEV number, and the port number 134 stores the data of "1" for ports in which the respective LDEVs are LU-defined and stores the data of "0" for ports in which the respective LDEVs are not LU-defined.

Figure 18:
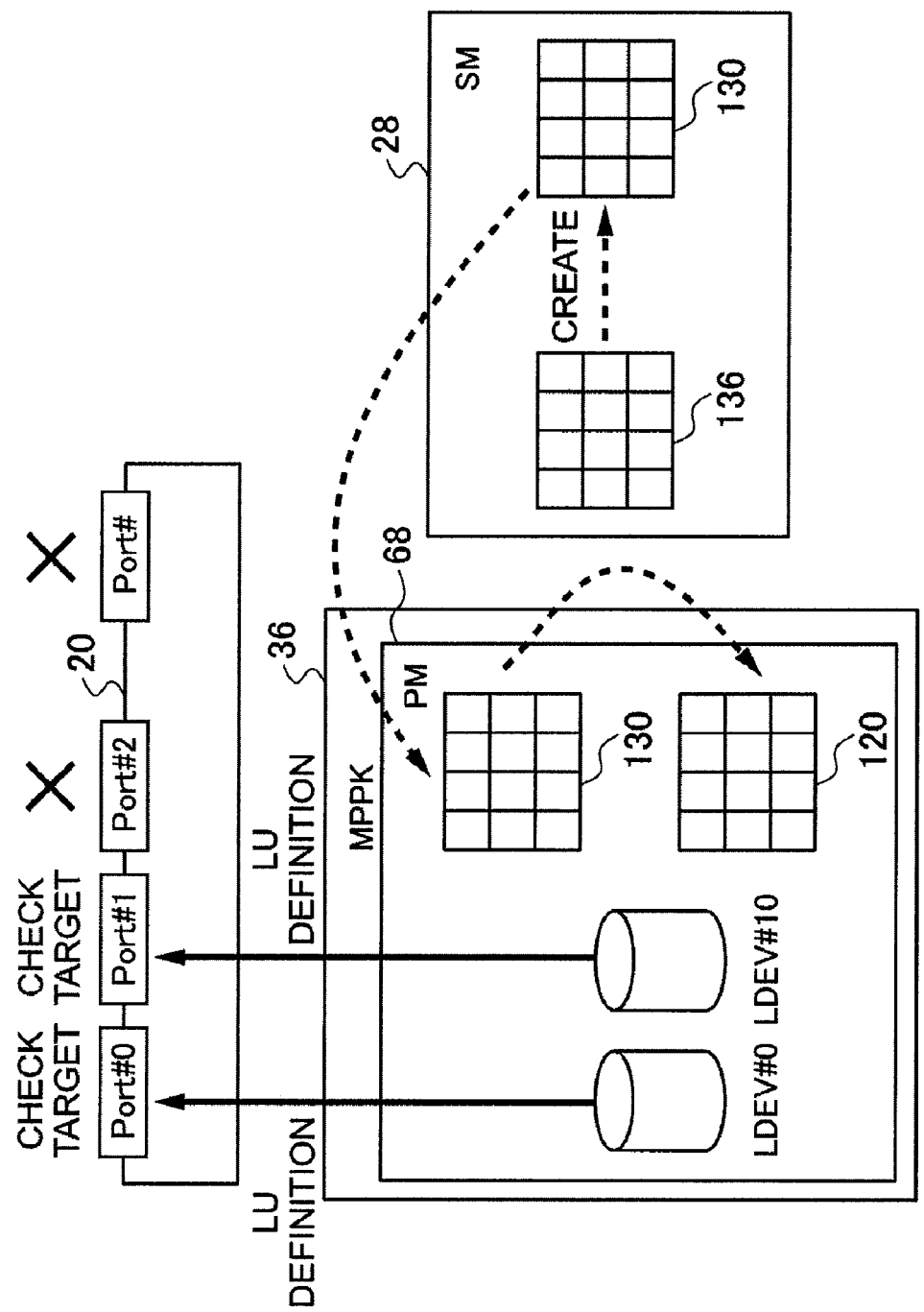
FIG. 18 is a diagram explaining the method of creating an LDEV-port correspondence table.

The LDEV-port correspondence table 130 is created, as shown in FIG. 18, based on the LDEV-MPPK correspondence table 136 stored in the shared memory 28, and, after being stored in the shared memory 28, is copied to the PM 68 of the respective MPPKs 36. The LDEV-port correspondence table 130 that was copied to the respective PMs 68 is used for creating the master bitmap tables 120, 124. Thus, as a result of reflecting information concerning the ports in which the respective LDEVs are LU-defined in the master bitmap tables 120, 124, and creating the port scan bitmap table 126 according to the master bitmap tables 120, 124, the ports in which the respective LDEVs are LU-defined can be excluded from the ports to be checked.

For example, in the case of the LDEV-port correspondence table 130 shown in FIG. 17, the #0 LDEV is LU-defined in relation to the #0 port, and the #10 LDEV is LU-defined in relation to the #1 port. Meanwhile, the #0 LDEV and the #10 LDEV are not LU-defined in relation to the #2 to #X ports. Thus, as the ports concerning the #0 LDEV and the #10 LDEV, the #0 port and the #1 port can be set as the ports to be checked, and the #2 to #X ports can be excluded from the ports to be checked.

Figure 19:
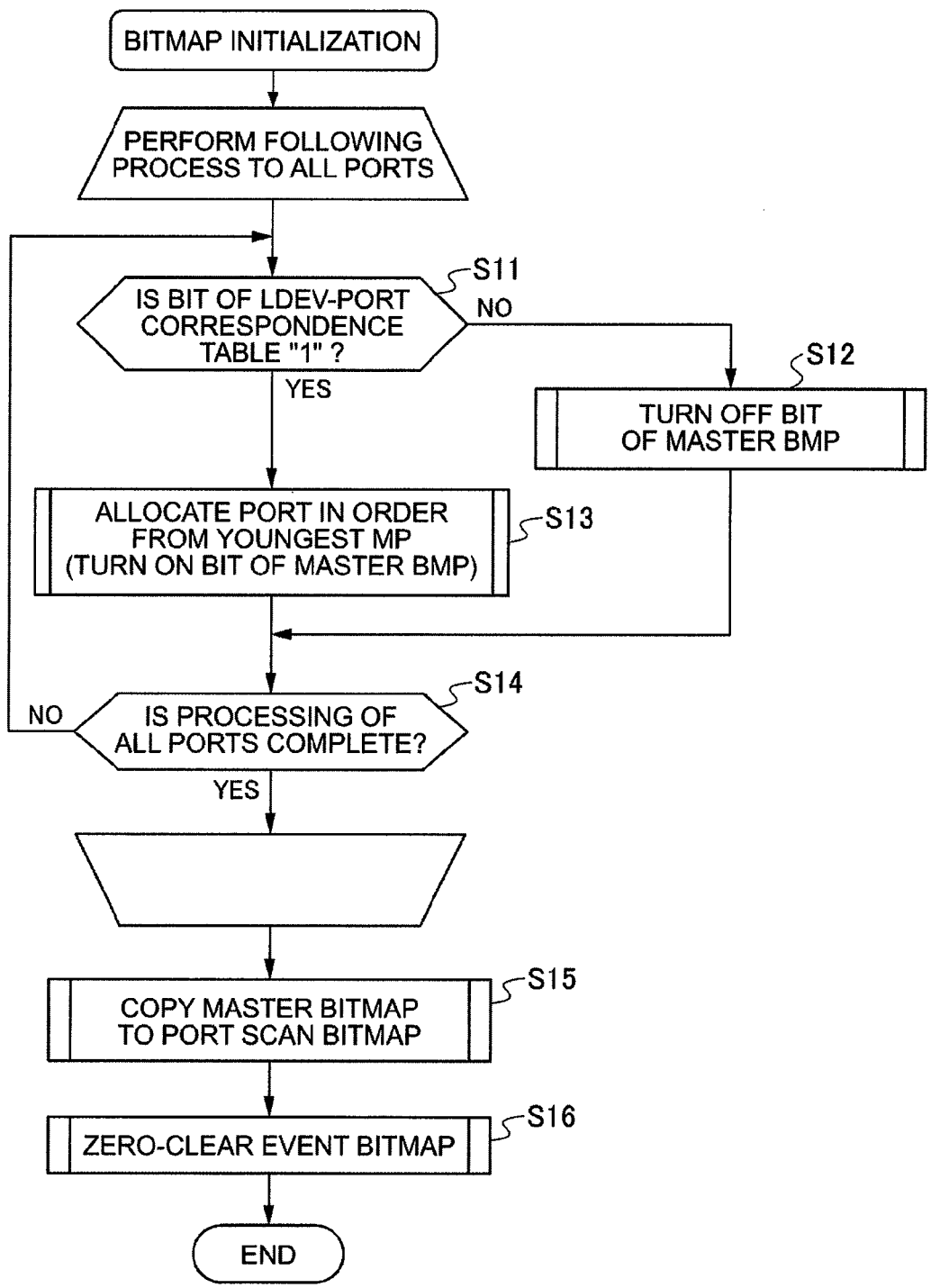
FIG. 19 is a flowchart explaining the processing for initializing the three types of bitmap tables.

The initialization processing of the three types of bitmap tables is now explained with reference to the flowchart of FIG. 19.

Figure 20:
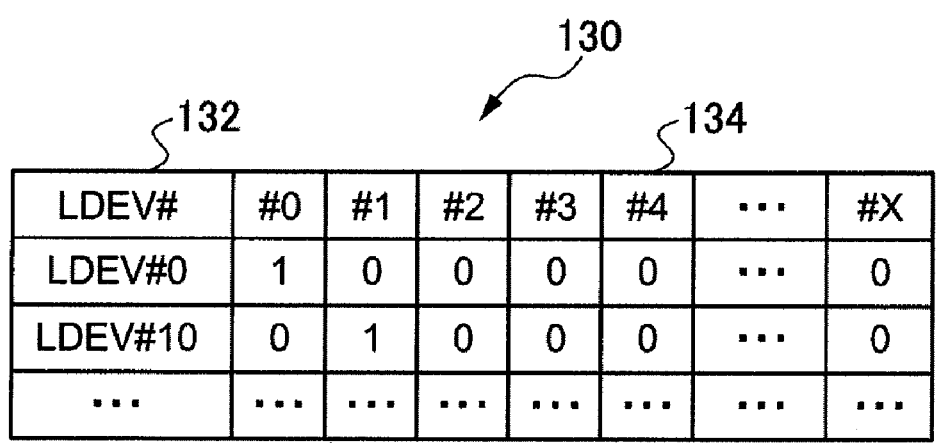
FIG. 20 is a configuration diagram of an LDEV-port correspondence table to be used in the initialization.

Foremost, upon initializing the three types of bitmap tables, the following processing is performed to all ports. Foremost, one MP 64 among the MPs 64 belonging to the respective MPPKs 36 refers to the LDEV-port correspondence table 130 shown in FIG. 20, and determines whether the bits regarding the respective ports are "1" (ON) (S11). If the MP 64 determines that the bits are not "1," it sets the bits of the master bitmap table 124 shown in FIGS. 21 to "0" (OFF) (S12), and proceeds to the processing of step S14.

Meanwhile, if the MP 64 determines that the bits are "1" at step S11, then the MP 64 allocates the respective ports, among the #0 to #3 MPs 64, in order from the #0 MP 64 to the #1, #2, #3 MPs 64 according to the LDEV-port correspondence table 130 (S13). Specifically, the MP 64 stores the data of "1" as the processing for turning the bits ON in the respective ports of the master bitmap table 124 shown in FIG. 21. For example, the MP 64 stores the data of "1" in the #0 to #3 MPs 64 regarding the #0 and #1 ports based on the LDEV-port correspondence table 130.

Thereafter, the MP 64 determines whether the processing regarding all ports is complete, and returns to step S11 if the processing of all ports is not complete and repeats the processing from step S11 to step S14. Meanwhile, if the processing of all ports is complete, the MP 64 performs processing for copying the data of the master bitmap table 124 to the port scan bitmap table 126 (S15). Thereafter, the MP 64 zero-clears all bitmaps of the event bitmap table 128 (S16), and thereby ends the processing of this routine.

Figure 21:
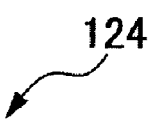
FIG. 21 is a configuration diagram of a master bitmap table to be used in the initialization, and shows the state before the narrowing down process.
Figure 22:
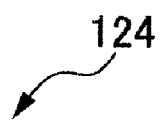
FIG. 22 is a configuration diagram of a master bitmap table to be used in the initialization, and shows the state after the narrowing down process.

Incidentally, the master bitmap table 124 shown in FIG. 21 shows a state where the ports with no LU definition are inhibited; that is, a state before the narrowing down process, and, when it is narrowed down to one MP 64 regarding one port, the configuration will be as shown in FIG. 22.

In the case shown in FIG. 22, the #0 MP 64 is able to set the #0 port as the port to be checked in the port scan, and exclude the other ports from the ports to be checked in the port scan. Moreover, the #1 MP 64 is able to set the #1 port as the port to be checked in the port scan, and exclude the other ports from the ports to be checked in the port scan.

As described above, since ports that are not LU-defined will never receive I/O information, as a result of excluding such ports from the ports to be checked in the port scan of the respective MPs 64, the port scan of the respective MPs 64 can be sped up.

Figure 23:
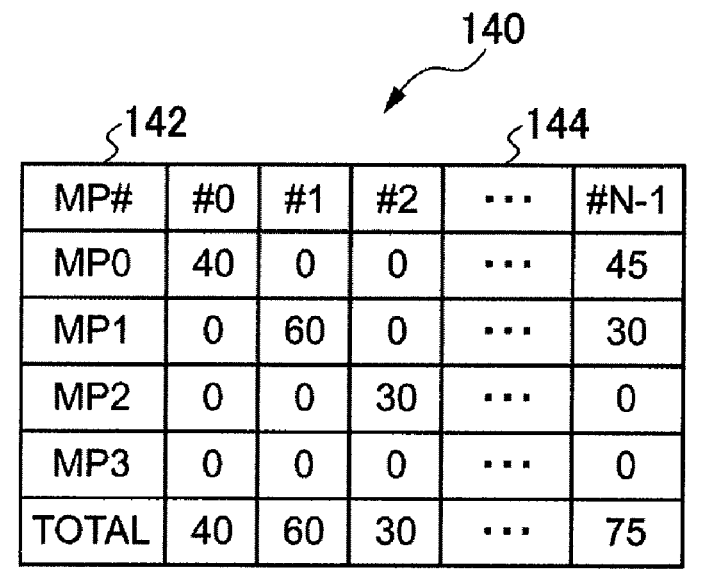

FIG. 23 shows the configuration of the port utilization ratio table 140. The port utilization ratio table 140 is a table for tallying and recording the port utilization ratio of the respective MPs 64, and is configured from an MP number 142, and #0 to #N−1 port numbers 144.

The example of the port utilization ratio table 140 shown in FIG. 23 shows that the port utilization ratio of the #0 port is 40 regarding the #0 MP 64, the port utilization ratio of the #1 port is 60 regarding the #1 MP 64, and the port utilization ratio of the #2 port is 30 regarding the #2 MP 64. The lowermost column of the port utilization ratio table 140 shows the total port utilization ratio in relation to the respective ports.

Figure 24:
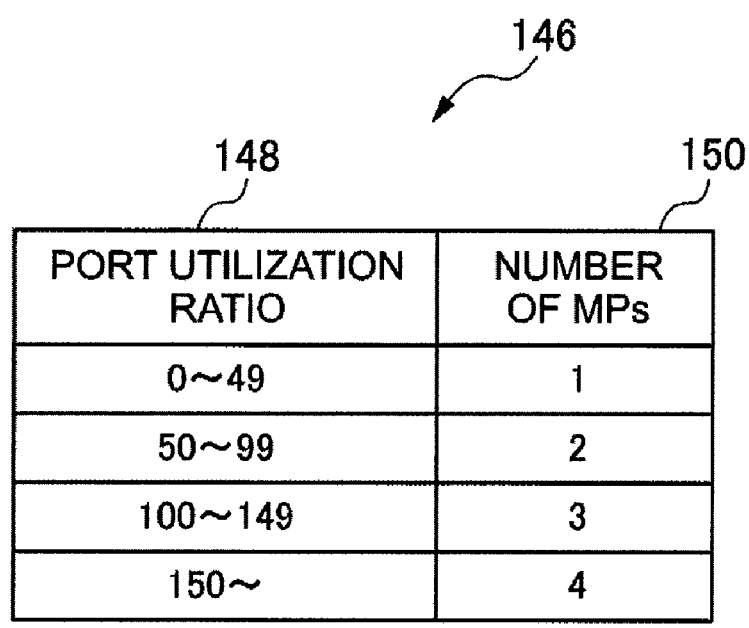
FIG. 24 is a configuration diagram of a port utilization ratio-MP quantity correspondence table.

FIG. 24 shows the configuration of the port utilization ratio-MP quantity correspondence table 146. The port utilization ratio-MP quantity correspondence table 146 is a table for deciding the number of shared MPs of the respective ports (number of MPs 64 to share the processing concerning the respective ports) based on the port utilization ratio, and is configured from a port utilization ratio 148 and an MP quantity 150.

The respective entries of the port utilization ratio 148 store, for example, "0 to 49", "50 to 99", "100 to 149", "150 or more" as the tuning parameter or threshold. In relation to the respective tuning parameters or thresholds, the respective entries of the MP quantity 150 store "1", "2", "3", and "4."

In the foregoing case, when the tuning parameter or threshold of the port utilization ratio 148 is "0 to 49," one MP 64 is allocated to the respective ports; when the tuning parameter or threshold of the port utilization ratio 148 is "50 to 99," two MPs 64 are allocated to the respective ports; when the tuning parameter or threshold of the port utilization ratio 148 is "100 to 149," three MPs 64 are allocated to the respective ports, and when the tuning parameter or threshold of the port utilization ratio 148 is "150 or more," four MPs 64 are allocated to the respective ports.

Specifically, when using the port utilization ratio-MP quantity correspondence table 146 shown in FIG. 24, one MP 64 is used when using "0 to 49" as the port utilization ratio 148, two MPs 64 are used when using "50 to 99" as the port utilization ratio 148, three MPs 64 are used when using "100 to 149" as the port utilization ratio 148, and four MPs 64 are used when using "150 or more" as the port utilization ratio 148. These numerical values can be automatically or manually set using the management terminal 32.

The initialization processing of the LDEV-port correspondence table 130 is now explained with reference to the flowchart of FIG. 25 to FIG. 27 and the sequence diagram of FIG. 28.

Figure 25:
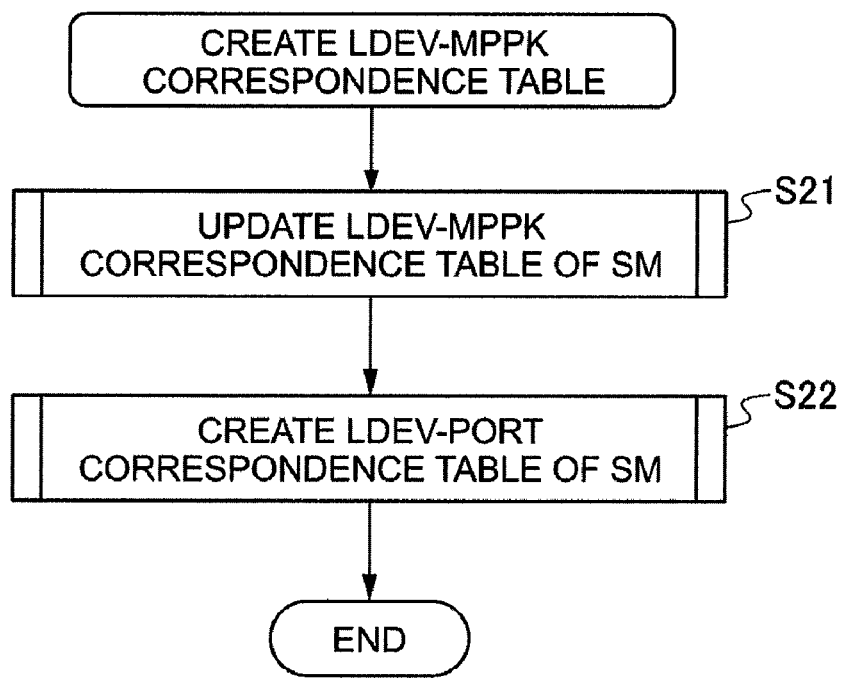
FIG. 25 is a flowchart explaining the method of creating an LDEV-MPPK correspondence table.

Foremost, as shown in FIG. 25, an arbitrary MP 64 belonging to all MPPKs 36; for example, an MP 64 with an owner right updates the LDEV-MPPK correspondence table 136 stored in the shared memory 28 (S21), creates the LDEV-port correspondence table 130 stored in the shared memory 28 (S22), and thereby ends the processing of this routine.

Figure 26:
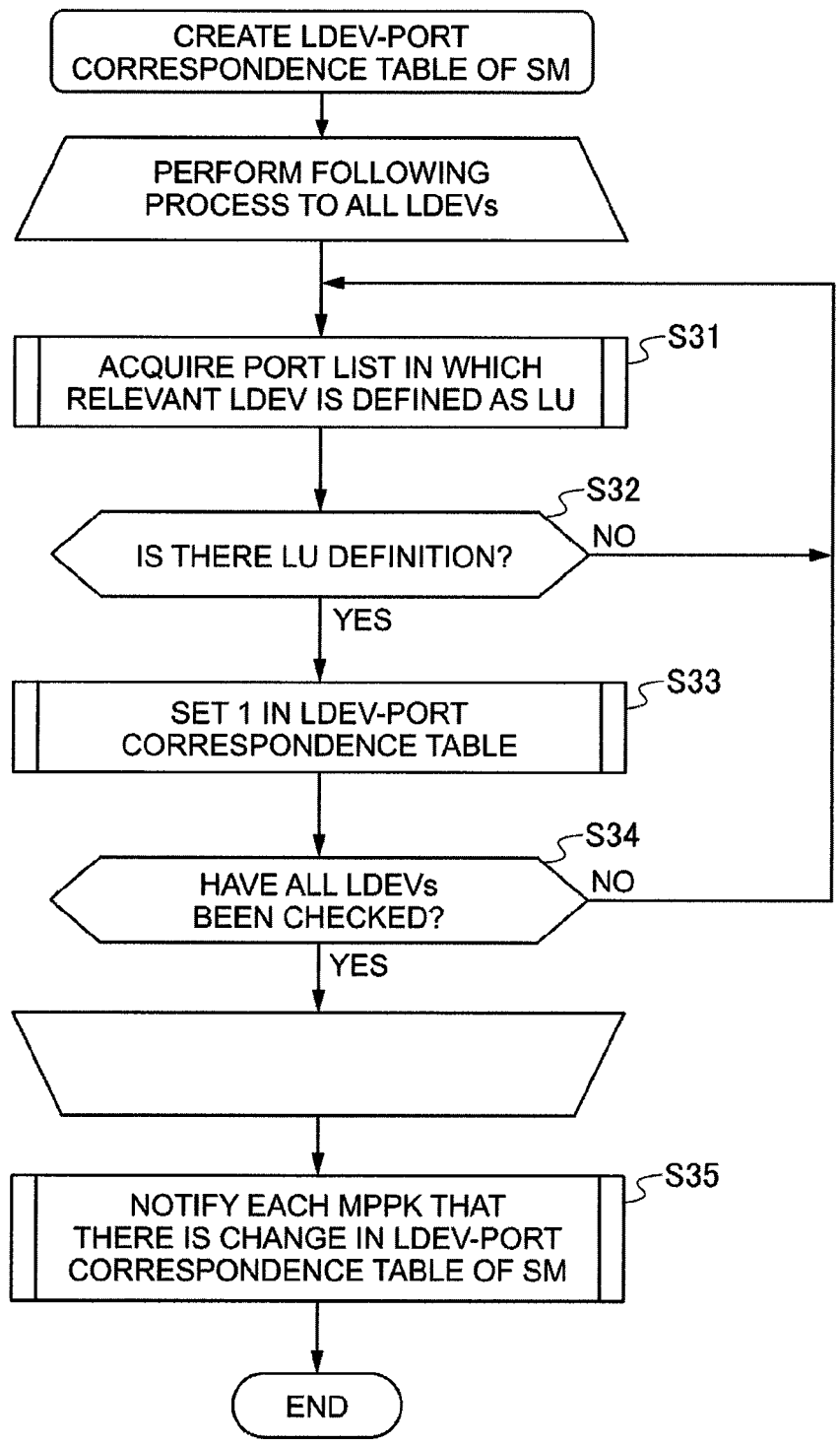
FIG. 26 is a flowchart explaining the method of creating an LDEV-port correspondence table in a shared memory.

Subsequently, upon creating the LDEV-port correspondence table 130 stored in the shared memory 28, as shown in FIG. 26, the MP 64 performs the following processing to all LDEVs.

Foremost, the MP 64 acquires a port list of ports in which the LDEV is LU-defined from the shared memory 28 (S31), determines whether the respective LDEVs are LU-defined (S32), and returns to the processing of step S31 when the LDEVs are not LU-defined. If the LDEVs are LU-defined, the MP 64 sets "1" in the LDEV-port correspondence table 130 (S33), determines whether all LDEVs have been checked (S34), and returns to step S31 if all LDEVs have not been checked. If all LDEVs have been checked, the MP 64 notifies the respective MPPKs 36 that there was a change in the LDEV-port correspondence table 130 of the shared memory 28; specifically, notifies that the LDEV-port correspondence table 130 has been newly created (S35), and thereby ends the processing of this routine.

Figure 27:
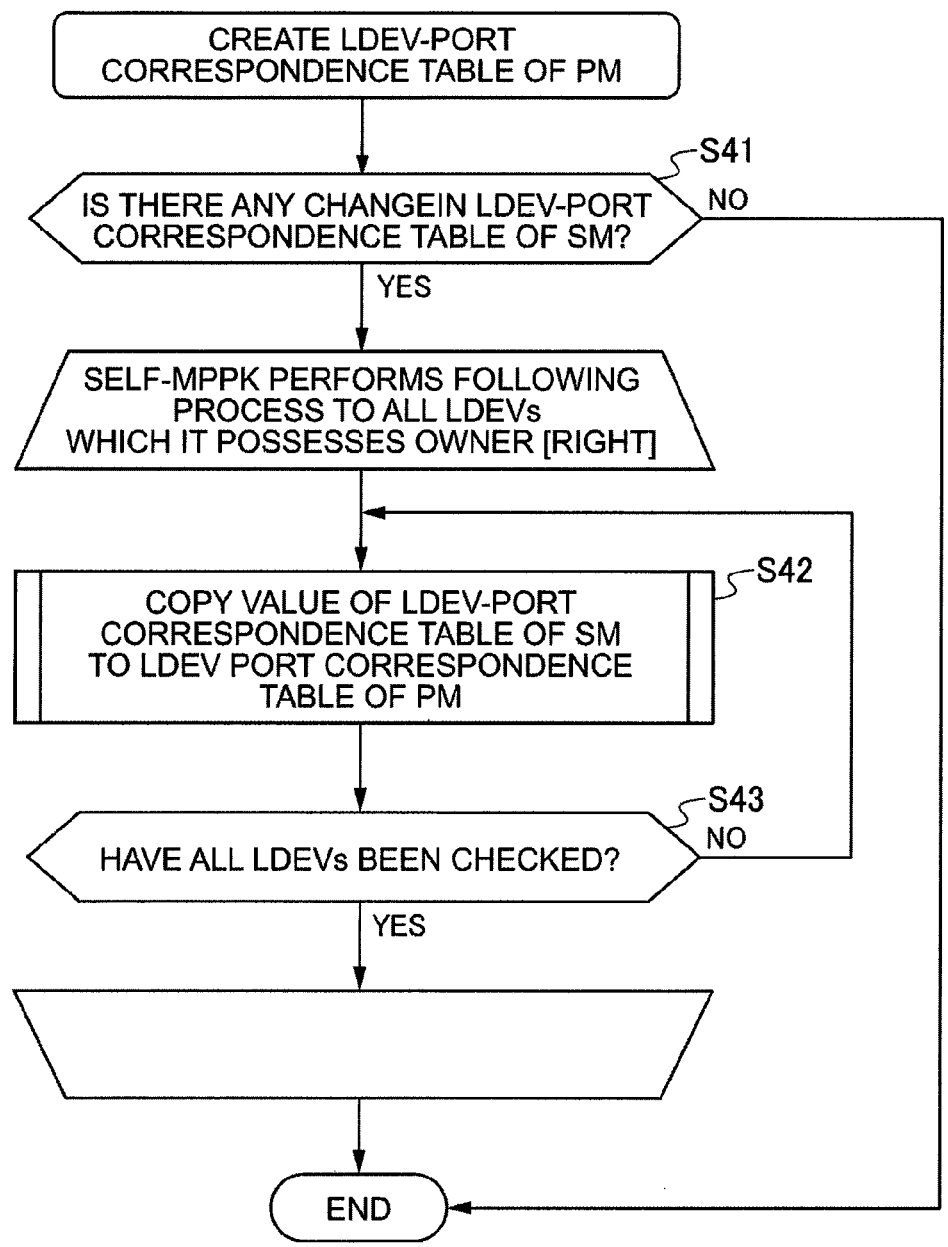
FIG. 27 is a flowchart explaining the method of creating an LDEV-port correspondence table in a PM.
Figure 28:
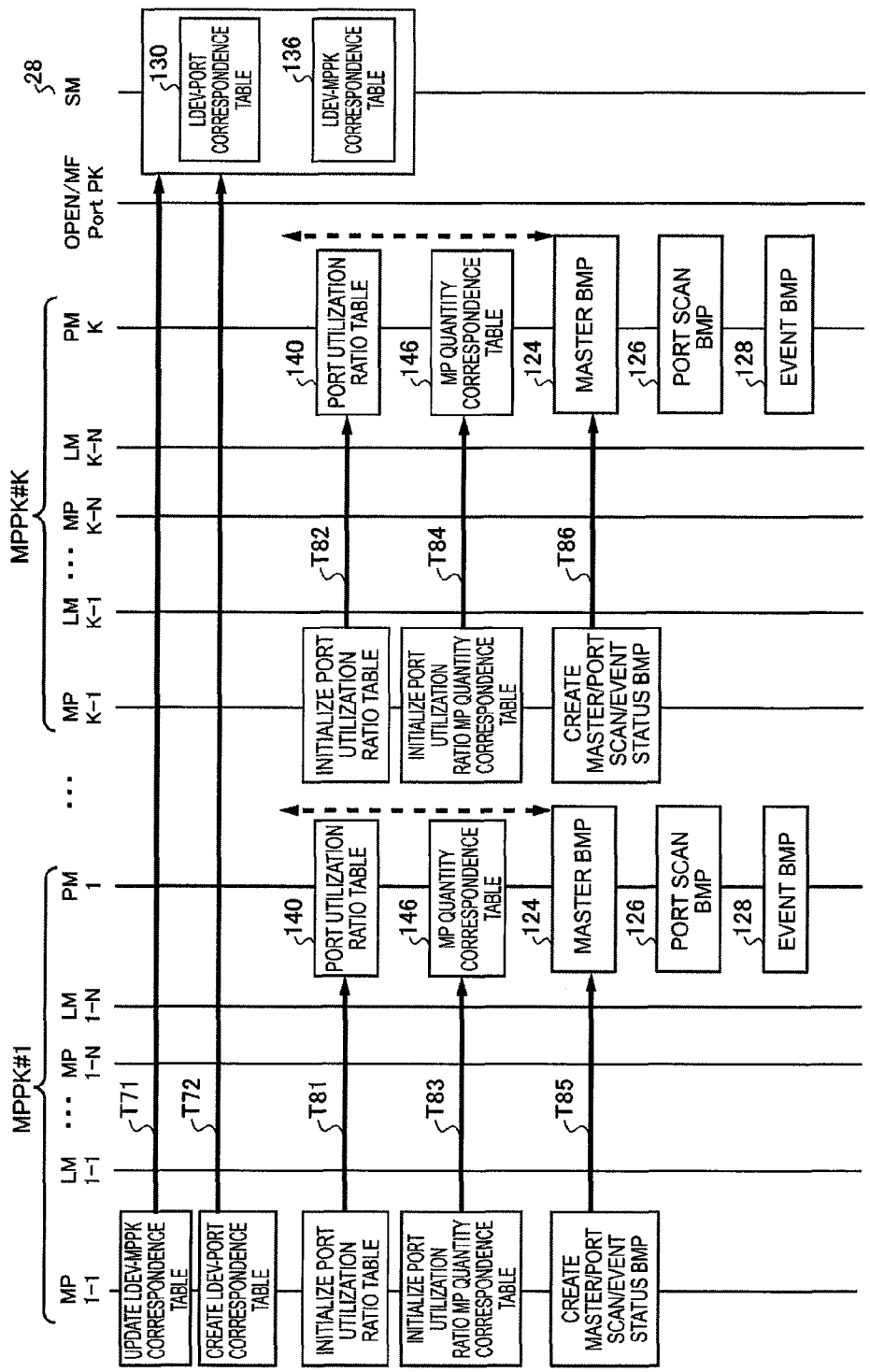
FIG. 28 is a sequence diagram explaining the table initialization processing.

Subsequently, when creating the LDEV-port correspondence table 130 of the PM 68, as shown in FIG. 27, one MP 64 among the MPs 64 belonging to the respective MPPKs 36 determines whether there is any change in the LDEV-port correspondence table 130 stored in the shared memory 28 (S41), and ends the processing of this routine if there is no change. Meanwhile, if there is a change, the self-MPPK 36 performs the following processing to all LDEVs with an owner right.

Specifically, the MP 64 copies the value of the LDEV-port correspondence table 130 stored in the shared memory 28 to the LDEV-port correspondence table 130 stored in the PM 68 (S42), and subsequently determines whether all LDEVs have been checked (S43). If all LDEVs have not been checked, the MP 64 returns to step S42, and if all LDEVs have not been checked, the MP 64 thereby ends the processing of this routine.

The initialization processing of the various tables is now explained with reference to the sequence chart of FIG. 28. Foremost, an arbitrary MP 64 among the MPs 64 belonging to all MPPKs 36; for example, the MP 64 belonging to the #1 MPPK updates the LDEV-MPPK correspondence table 136 stored in the shared memory 28 at timing T71, and creates the LDEV-port correspondence table 130 stored in the shared memory 28 at timing T32.

Meanwhile, one MP 64 among the MPs 64 belonging to the respective MPPKs 36 initializes the port utilization ratio table 140 stored in the PM 68 at timing T81, T82, and initializes the port utilization ratio-MP quantity correspondence table 146 stored in the PM 68 at timing T83, T84.

Subsequently, the one arbitrary MP 64 belonging to the respective MPPKs 36 creates the master bitmap table 124, the port scan bitmap table 126, and the event bitmap table 128 at timing T85, T86, stores each of the created tables in the PM 68.

Figure 29:
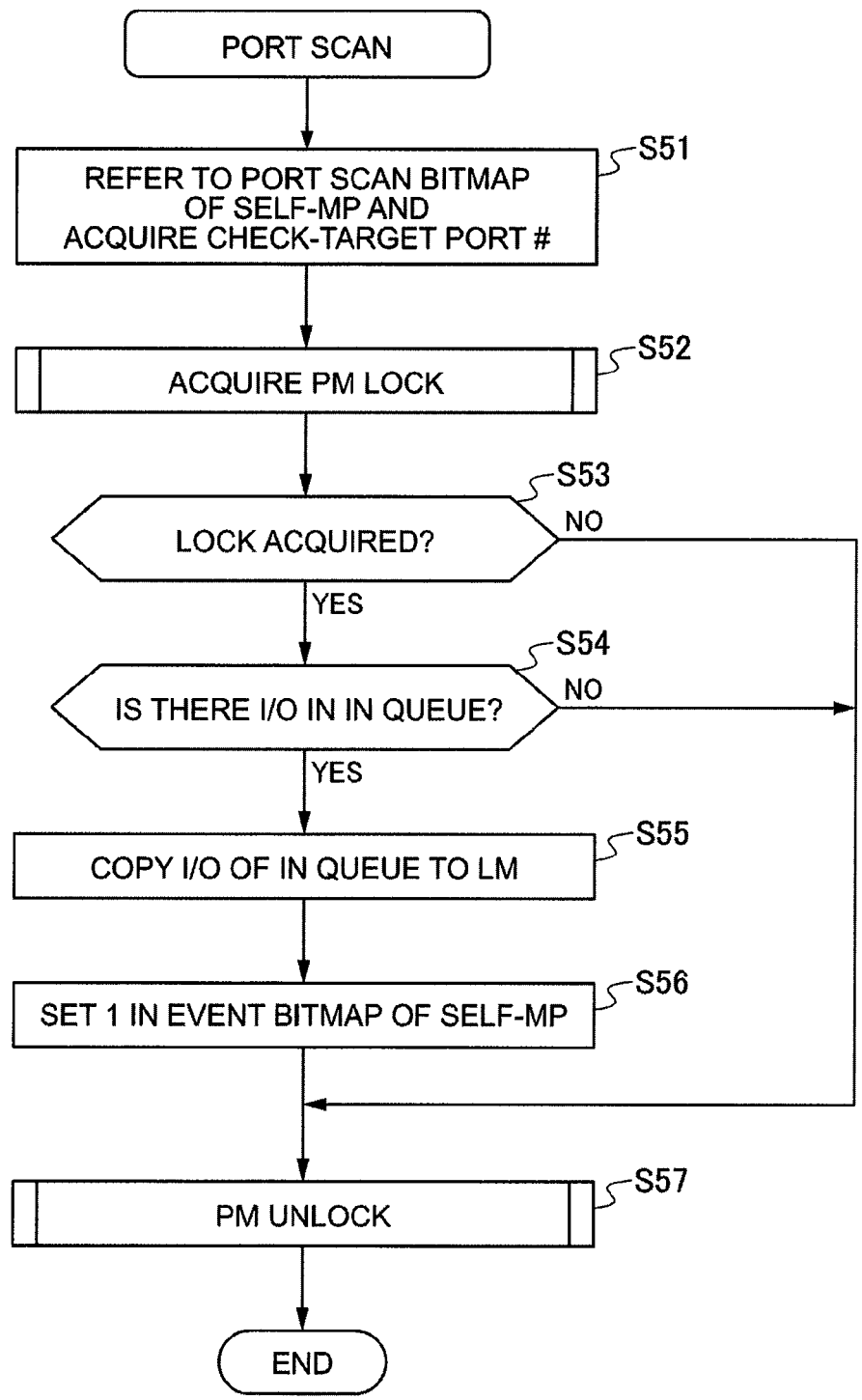
FIG. 29 is a flowchart explaining the processing for performing a port scan using a port scan bitmap table.
Figure 30:
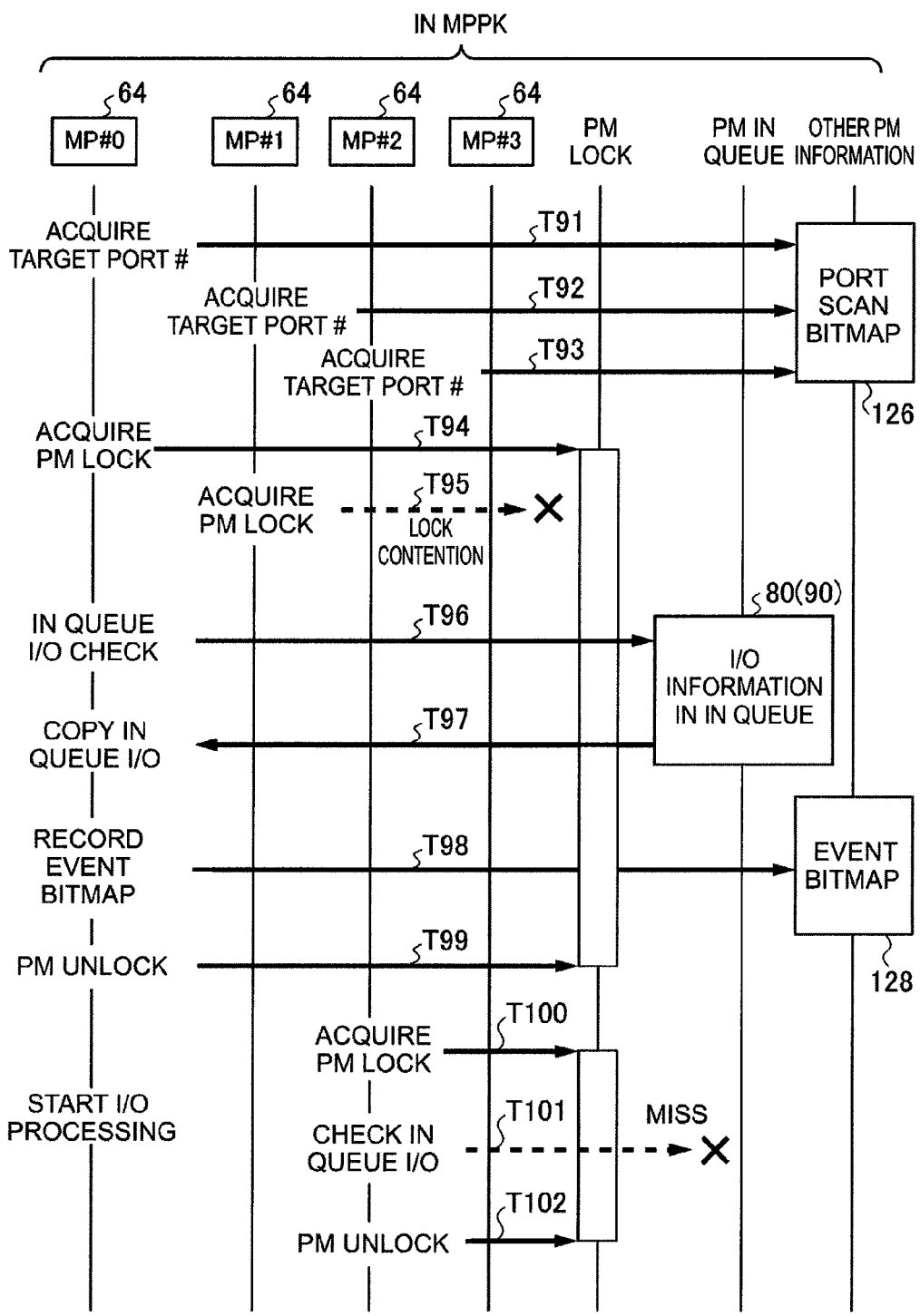
FIG. 30 is a sequence diagram explaining the processing for performing a port scan using a port scan bitmap table.

The processing of performing a port scan when using the port scan bitmap 126 and the event bitmap 128 is now explained with reference to the flowchart of FIG. 29 and the sequence diagram of FIG. 30.

The MP 64 belonging to the respective MPPKs 36 refers to the port scan bitmap table 126 of the self-MP 64, and acquires a check-target port number (S51). For example, as shown in FIG. 30, the #0 MP 64 refers to the port scan bitmap table 126 at timing T91, the #1 MP 64 refers to the port scan bitmap table 126 at timing T92, and the #2 MP 64 refers to the port scan bitmap table 126 at timing T93. Here, upon acquiring the check-target port number, the respective MPs 64 acquire the check-target port number of ports of "1" in the port scan bitmap 126.

Subsequently, the #0 MP 64 acquires a lock to the PM 68 at timing T94. For example, the #0 MP 64 acquires a lock to the #0 port according to the port scan bitmap table 126 shown in FIG. 15 (S52). In the foregoing case, even if the #1 to #3 MPs 64 perform the processing for acquiring a lock to the #0 port at timing T95, the acquisition of the lock will be prevented.

Thereafter, the #0 MP 64 determines whether the lock was acquired (S53), and proceeds to the processing of step S57 if the lock could not be acquired. Meanwhile, if the lock was acquired, the #0 MP 64 checks the I/O information in the port IN queue 80 or the port IN queue 90 at timing T96, and determines whether the I/O information exists in the queue 81 or the queue 91 (S54). If no I/O information exists in the queue 81 or the queue 91, the #0 MP 64 proceeds to the processing of step S57, and, when I/O information exists in the queue 81 or the queue 91, the #0 MP 64 copies the I/O information existing in the queue 81 or the queue 91 to the LM 70 at timing T97 (S55), and sets "1" in the event bitmap table 128 of the self-MP 64 at timing T98 (S56).

Thereafter, the #0 MP 64 unlocks the PM 68 at timing T99 (S57), and thereby ends the processing of this routine.

Incidentally, the #2 MP 64 will perform the processing of acquiring a lock to the PM 68 at timing T100, subsequently refer to the port IN queue 80 or the port IN queue 90 at timing T101, consider it to be a miss if no I/O information exists in the queue 81 or the queue 91, and unlock the PM 68 at timing T102.

Figure 31:
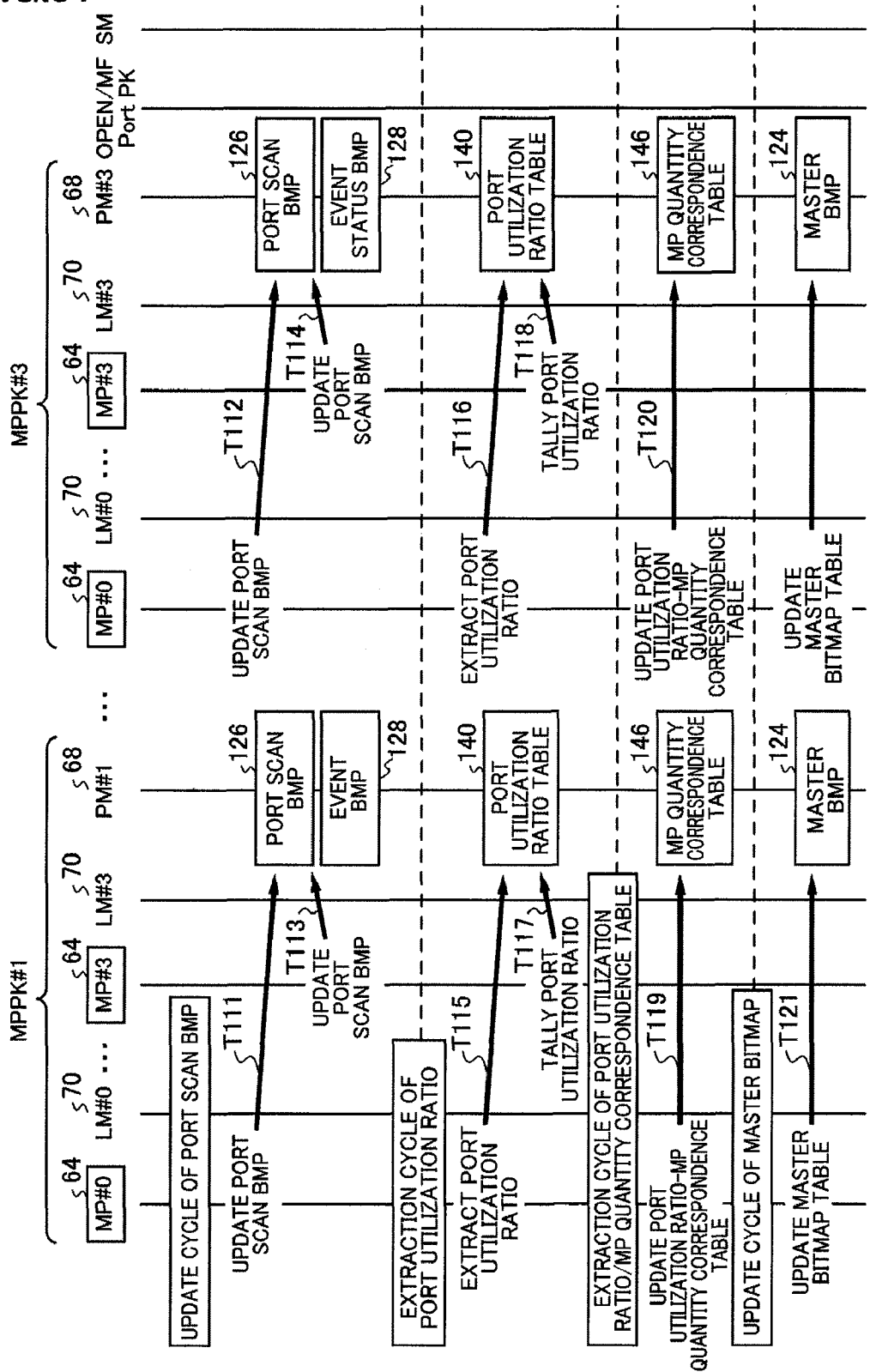
FIG. 31 is a sequence diagram explaining the periodical processing in an MPPK.

The periodical processing for updating the respective table is now explained with reference to the sequence diagram of FIG. 31.

Foremost, upon performing the port scan bitmap table update periodical processing, the respective MPs 64 belonging to the respective MPPKs 36 copies the contents of the event bitmap table 128 to the port scan bitmap table 126 at timing T111 to T114, and updates the port scan bitmap table 126. Consequently, when the respective MPs 64 are to perform a port scan, the processing will be performed according to the updated port scan bitmap table 126.

Subsequently, upon performing the port utilization ratio extraction periodical processing, the respective MPs 64 of the respective MPPKs 36 tally the contents of the port utilization ratio table 140 at timing T115 to T118. Specifically, in consideration of the fact that the port utilization ratio will change pursuant to the I/O processing, the respective MPs 64 belonging to the respective MPPKs 36 tally the contents of the port utilization ratio table 140 for each port utilization ratio extraction cycle.

Subsequently, upon performing the port utilization ratio/MP quantity correspondence table update periodical processing, one arbitrary MP 64 among the MPs 64 belonging to the respective MPPKs 36 updates the contents of the port utilization ratio-MP quantity correspondence table 146 at timing T119, T120. For example, the one arbitrary MP 64 performs processing for updating the values of the respective entries of the port utilization ratio 148 or changing the numerical values of the respective entries of the MP quantity 150.

Subsequently, upon performing the master bitmap table update periodical processing, one arbitrary MP 64 among the MPs 64 belonging to the respective MPPKs 36 updates the contents of the master bitmap table 124 at timing T121, T122.

Figure 32:
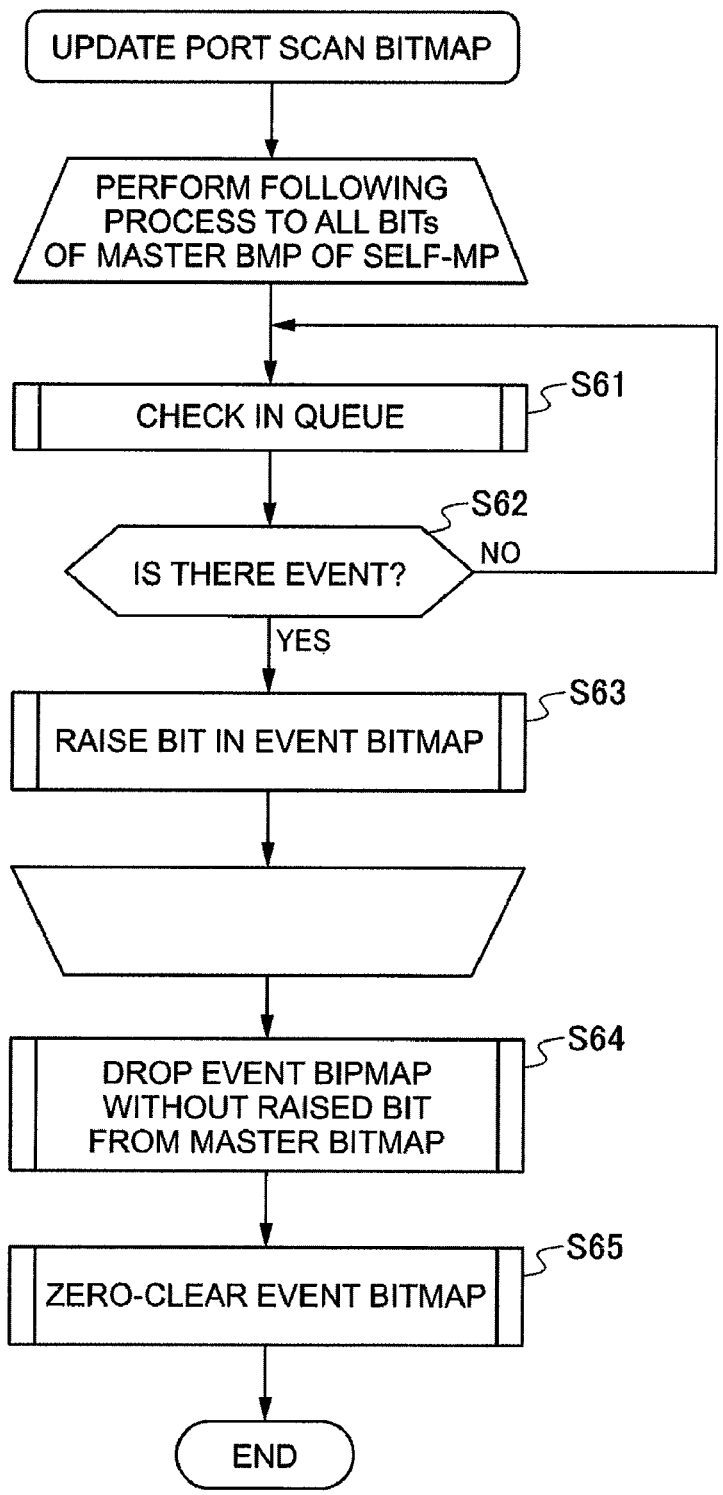
FIG. 32 is a flowchart explaining the update processing of a port scan bitmap table.

The method of updating the port scan bitmap table is now explained with reference to the flowchart of FIG. 32.

This processing is performed by the respective MPs 64 belonging to the respective MPPKs 36 at a fixed cycle. Foremost, upon updating the port scan bitmap table 126, the respective MPs 64 perform the following processing to all bits of the master bitmap table 124 of the self-MP 64.

Figure 33:
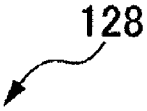
FIG. 33 is a configuration diagram of an event map table to be used in the update processing of the port scan bitmap table.

Foremost, the respective MPs 64 check the port IN queue 80 or the port IN queue 90 (S61), and determines whether there is a port event in the queue 81 or the queue 91 (S62). If there is no port event, the MP 64 returns to the processing of step S61, and, if there is a port event, as shown in FIG. 33, the MP 64 raises a bit of "1" in the event bitmap table 128 (S63). Specifically, although the bits corresponding to the ports in which a port event was not detected is "0" in the event bitmap table 128, the bits corresponding to the ports in which a port event was detected will be "1."

Subsequently, the respective MPs 64 refer to the master bitmap table 124, and performs processing for dropping the bits in which "1" is not raised in the event map table 128 based on the master bitmap table 124 (S64).

Figure 34:
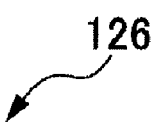
FIG. 34 is a configuration diagram of a port scan bitmap table showing the state before reflecting the contents of the event bitmap table.
Figure 35:
FIG. 35 is a configuration diagram of a port scan bitmap table showing the state after reflecting the contents of the event bitmap table.

Here, when the contents of the event bitmap table 128 shown in FIG. 33 are reflected in the port scan bitmap table 126 shown in FIG. 34, the port scan bitmap table 126 will be of a status where the contents are updated as shown in FIG. 35.

For example, in the case of the #1 MP 64, even if a port scan is performed according to the port scan bitmap table 126 shown in FIG. 34, since there is no port event in the #1 port, as shown in FIG. 35, the bit corresponding to the #1 port is updated from "1" to "0" in the port scan bitmap table 126.

Similarly, in the case of the #2 MP 64, even if a port scan is performed according to the port scan bitmap table 126 shown in FIG. 34, since there is no port event in the #2 port, as shown in FIG. 35, the bit of "1" corresponding to the #2 port is updated to "0" in the port scan bitmap table 126.

Subsequently, the respective MPs 64 zero-clears all bits of the event bitmap table 128 shown in FIG. 33 (S65), and thereby end the processing of this routine. Incidentally, the contents of the event bitmap table 128 will be updated based on the status of the port event when a port scan is performed by the respective MPs 64.

As described above, as a result of updating the event bitmap table 128 according to the generation status of the port event and reflecting the contents of the updated event bitmap table 128 in the port scan bitmap table 126, and using the port scan bitmap table 126 with the contents of the event bitmap table 128 reflected therein when the respective MPs 64 are to perform a port scan, the port IN queue check to the ports without any port event can be omitted.

The port-MP association method is now explained. In this example, the following three types of methods are used.

First Port-MP Association Method

With the first port-MP association method, the number of shared MPs is decided for each port based on the port utilization ratio, and the ports are allocated in order from the MP 64 with the lowest MP utilization ratio.

If the first port-MP association method is adopted, the MPs 64 can be allocated sensitively to each port, and the MP utilization ratio of the MP 64 can be equalized easily. It is also possible to equalize the number of ports to be processed with the respective MPs 64.

Second Port-MP Association Method

With the second port-MP association method, the associated MP 64 is decided for each port based on the port utilization ratio, and the respective ports are allocated to the respective MPs 64 so that the MP utilization ratio of the respective MPs 64 is averaged.

According to the second port-MP association method, the MP utilization ratio of the respective MPs 64 can be equalized, and the logic for switching the exclusive mode and the share mode can be simplified.

Third Port-MP Association Method

With the third port-MP association method, hysteresis control is performed by providing a two-tier threshold (upper threshold and lower threshold) to the MP utilization ratio and, each time the MP utilization ratio exceeds the upper threshold, the shared MP is increased one MP at a time to all associated ports of the MP 64, and, each time the MP utilization ratio falls below the lower threshold, the shared MP is decreased one MP at a time from all associated ports of the MP 64.

According to the third port-MP association method, since there are two thresholds, it is possible to inhibit the MP utilization ratio from oscillating in the vicinity of one threshold, and the logic for switching the exclusive mode and the share mode can be simplified.

The specific contents of the three types of port-MP association methods are now explained.

Figure 36:
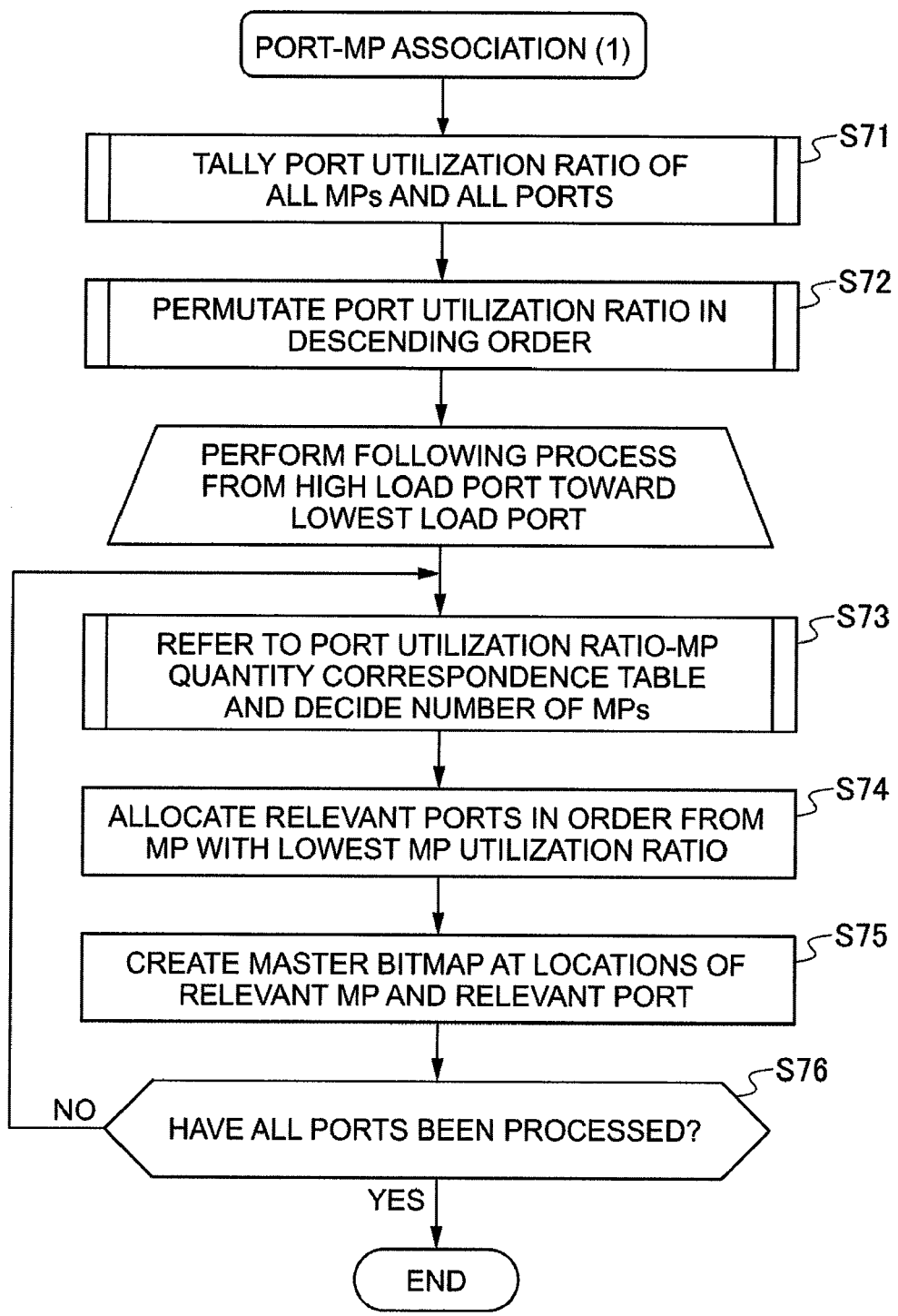
FIG. 36 is a flowchart explaining the first port-MP association method.

Foremost, the first port-MP association method is explained with reference to the flowchart of FIG. 36. This processing is performed by one arbitrary MP 64 among the MPs 64 belonging to the respective MPPKs 36 at a prescribed cycle.

Foremost, the MP 64 incorporates and tallies the port utilization ratio concerning all ports from the PM 68 regarding all MPs 64 (S71), and thereafter performs processing of permutating the port utilization ratio in descending order in order to balance the number of ports to be shared among the MPs (S72).

Figure 37:
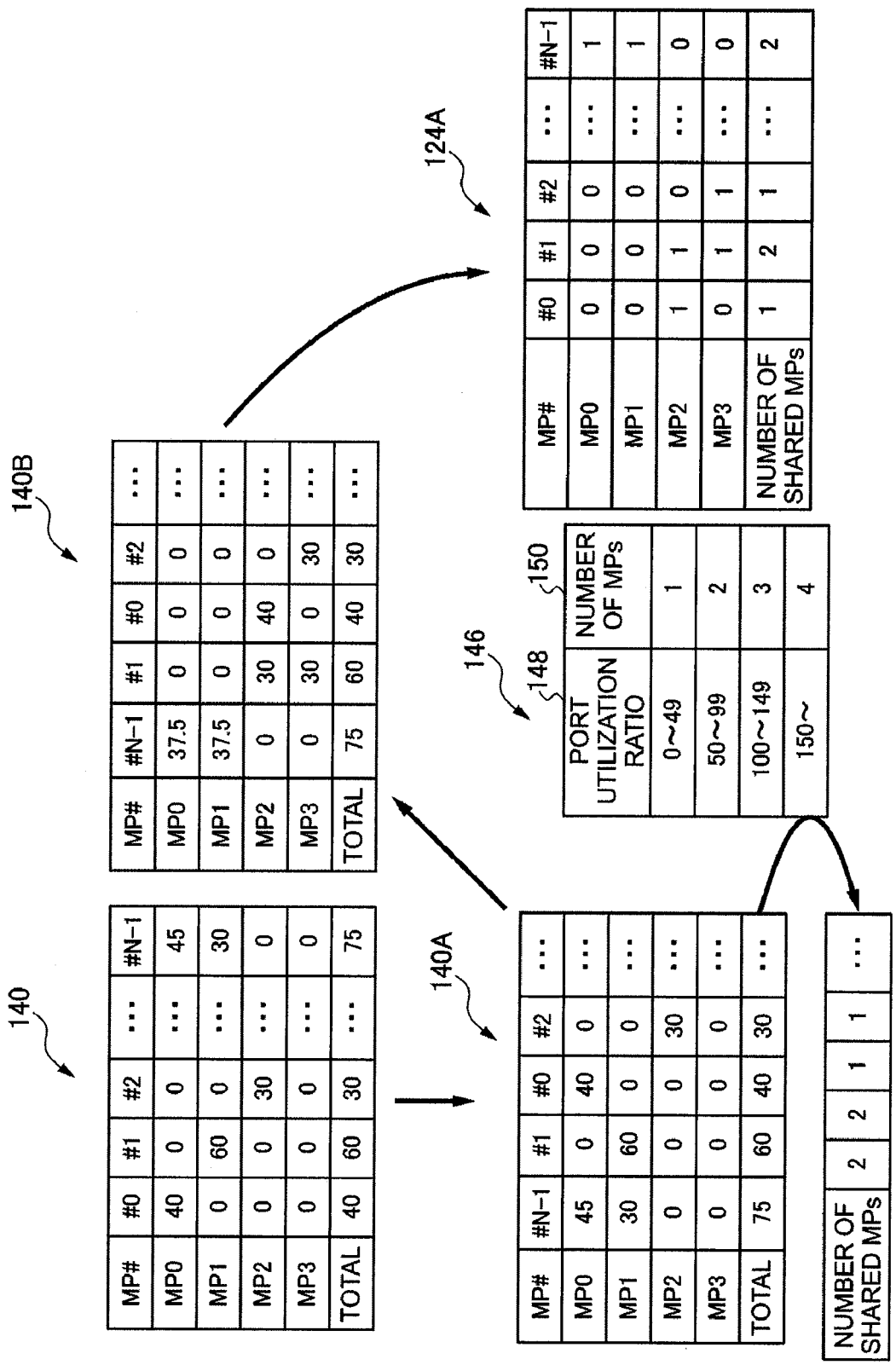
FIG. 37 is a diagram explaining the method of updating the port utilization ratio table and the master bitmap table with the first port-MP association method.

For example, as shown in FIG. 37, the MP 64 permutates the port utilization ratio in descending order regarding the port utilization ratio table 140 before review, and creates the port utilization ratio table 140A as the permutated port utilization ratio table.

Subsequently, the MP 64 performs the following processing from the highest load port toward the lowest load port.

Foremost, the MP 64 decides the MP quantity by referring to the port utilization ratio table 140A and the port utilization ratio-MP quantity correspondence table 146 (S73), and thereafter allocates the ports in order from the MP 64 of the lowest MP utilization ratio in order to balance the load among the MPs (S74).

Next, the MP 64 creates a master bitmap table based on data corresponding to the load of the port regarding the MP 64 to which the port was allocated (S75), and determines whether all ports have been processed (S76). If all ports have not been processed, the MP 64 returns to the processing of step S73 and repeats the processing of steps S73 to S76. Meanwhile, if all ports have been processed, the MP 64 thereby ends the processing of this routine (S76).

At steps S73, S74, as shown in FIG. 37, when referring to the port utilization ratio table 140A and the port utilization ratio-MP quantity correspondence table 146, since the total port utilization ratio of the #N−1 port is "75" and the MP quantity 150 is "2," the value obtained by dividing the port utilization ratio="75" by "2," which is "37.5," is allocated to the #0 and #1 MPs 64, respectively.

Similarly, since the total port utilization ratio of the #1 port is "60," the value obtained by dividing the port utilization ratio="60" by the shared MP quantity="2," which is "30," is allocated to the #2 and #3 MPs 64, respectively. Since the total port utilization ratio of the #0 and #2 ports is "40" or "30" and the shared MP quantity 150 is "1," the port utilization ratio="40" is allocated to the #2 MP 64 in which the allocated port utilization ratio is lower than the #0 and #1 MPs 64. Moreover, since the port utilization ratio="40" was allocated to the #2 MP 64 regarding the #2 port, the port utilization ratio="30" is allocated to the #3 MP 64. Based on the foregoing allocation, the port utilization ratio table 140B is created from the port utilization ratio table 140A.

Thereafter, the MP 64 reflects the port utilization ratio table 140B in the master bitmap table 124, and creates the master bitmap table 124A shown in FIG. 37. The master bitmap table 124A is reflected in the port scan bitmap table 126.

Thus, as a result of the respective MPs 64 using the port scan bitmap table 126 with the contents of the master bitmap table 124A reflected therein during the subsequent port scan, the port scan can be sped up without having to check all ports.

Moreover, since certain MPs 64 among the respective MPs 64 can shift the processing to another MP 64, the load can be balanced. For example, the #0 MP 64 is able to balance the load by shifting the processing concerning the #0 port to the #2 MP 64, and the #1 MP 64 is able to balance the load by shifting the processing concerning the #1 port to the #2 and #3 MPs 64.

In the master bitmap table 124A, the bits storing a numerical value where the port utilization ratio is greater than 0 in the port utilization ratio table 140B become "1," and the bits where the port utilization ratio is 0 remain "0."

As described above, as a result of using the first port-MP association method, the MPs 64 to perform the processing of the respective ports can be changed according to the port utilization ratio. It is thereby possible to balance of the load of certain MPs 64.

Figure 38:
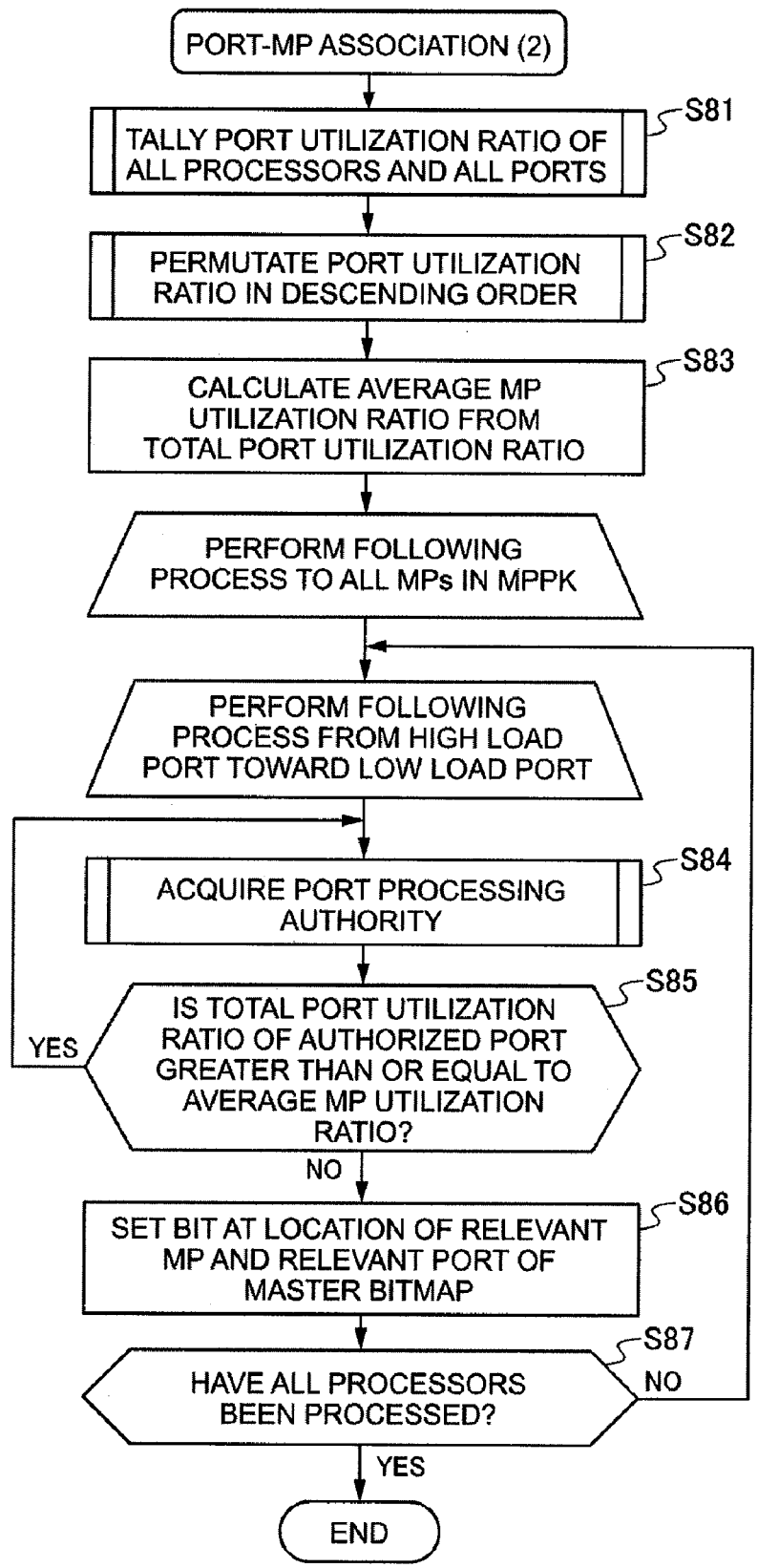
FIG. 38 is a flowchart explaining the second port-MP association method.

The second port-MP association method is now explained with reference to the flowchart of FIG. 38. This processing is performed by one arbitrary MP 64 in the respective MPPKs 36 at a prescribed cycle.

Figure 39:
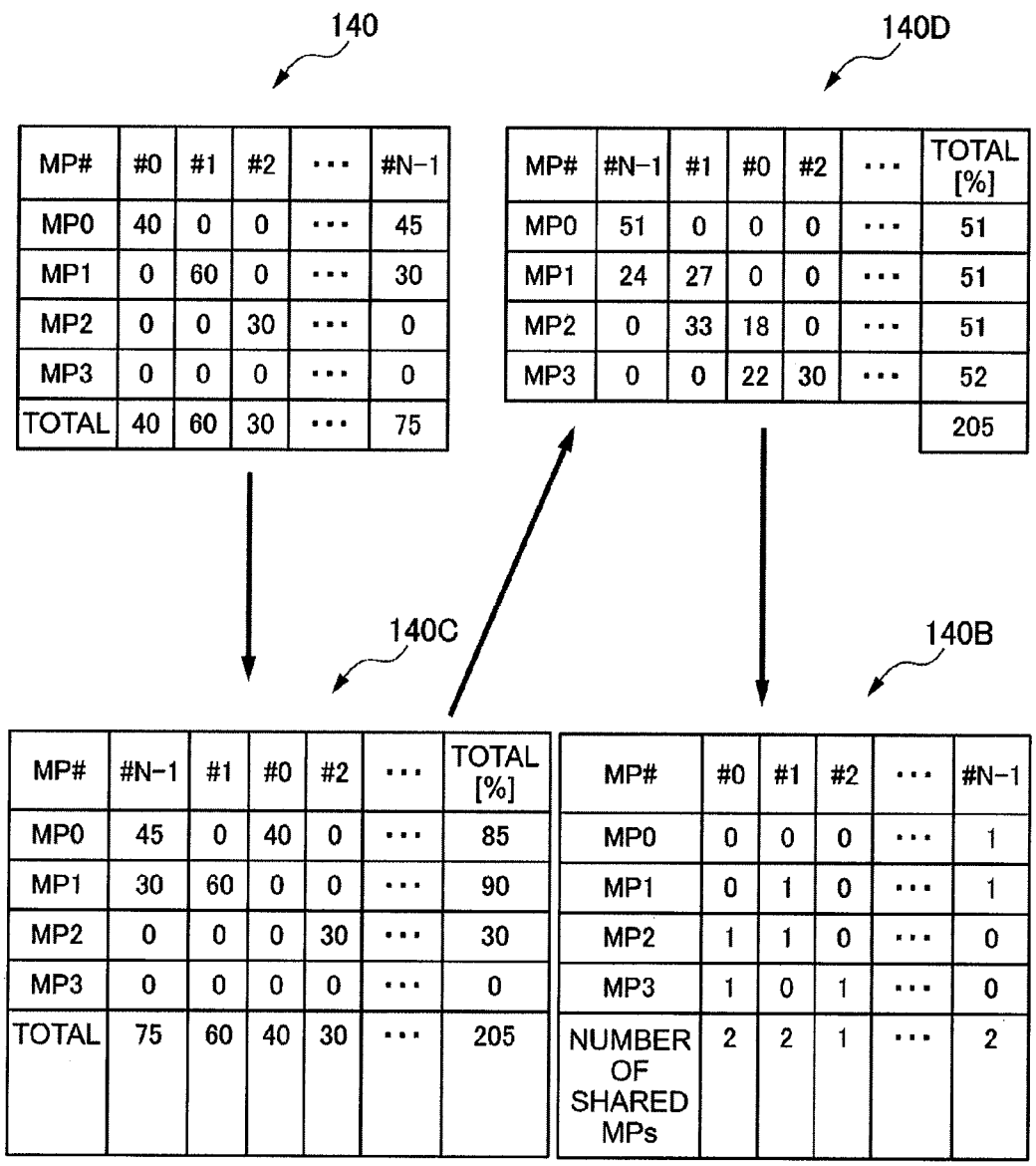
FIG. 39 is a diagram explaining the method of updating the port utilization ratio table and the master bitmap table with the second port-MP association method.

Foremost, the MP 64 incorporates and tallies the port utilization ratio concerning all ports from the PM 68 regarding all MPs 64 (S81), and thereafter performs processing of permutating the port utilization ratio in descending order (S82). For example, as shown in FIG. 39, the MP 64 permutates the port utilization ratio in descending order regarding the ports of the port utilization ratio table 140 before review, and creates the port utilization ratio table 140C as the permutated port utilization ratio table.

Thereafter, the MP 64 calculates the average MP utilization ratio based on the total port utilization ratio (S83). For example, the MP 64 refers to the port utilization ratio table 140C, and, if the total port utilization ratio of the respective ports is 205, this total of 205 is divided by the MP quantity of 4 to calculate the average value=51%.

Subsequently, the MP 64 performs the following processing to all MPs 64 in the MPPK 36, and performs the following processing from a high load port toward a low load port.

For example, the MP 64 acquires the port processing authority regarding the respective ports (S84), and thereafter determines whether the total port utilization ratio of the authorized ports is greater than or equal to the average MP utilization ratio (S85). If the total port utilization ratio greater than or equal to the average utilization ratio, the MP 64 returns to the processing of step S84, and repeats the processing of steps S84 and S85.

Meanwhile, if the total port utilization ratio is not greater than or equal to the average MP utilization ratio, the MP 64 sets a bit in that MP 64 of the master bitmap table 124 based on data corresponding to the location of that port (S86), and determines whether all MPs have been processed (S87). If all MPs 64 have not been processed, the MP 64 returns to step S84, repeats the processing of steps S84, S85, and S86. If all MPs 64 have been processed, the MP 64 thereby ends the processing of this routine.

At steps S84, S85, the MP 64 refers to the port utilization ratio table 140C shown in FIG. 39, and creates the port utilization ratio table 140D as the reviewed port utilization ratio table so that the port utilization ratio of the respective MPs handling the respective ports will become an average value.

For example, since the total port utilization ratio of the #N−1 port is 75, 51 is set as the port utilization ratio in the #0 MP 64, and 24 (24=75−51) is set in the #1 MP 64. Since the total port utilization ratio is 60 in the #1 port and 24 has already been set as the port utilization ratio in the #1 MP 64, 27 (27=51−24) is set. Moreover, 33 (33=60−27) is set as the port utilization ratio in the #2 MP 64 regarding the #1 port. Similarly, 18 is set as the port utilization ratio in the #2 MP 64 regarding the #0 port, 22 is set as the port utilization ratio in the #3 MP 64, and 30 is set as the port utilization ratio in the #3 MP 64 regarding the #2 port.

Moreover, at steps S86, S87, the MP 64 reflects the contents of the port utilization ratio table 140 in the master bitmap table 124 and thereby creates the master bitmap table 124B.

As described above, as a result of using the second port-MP association method, the associated ports can be decided to the respective MPs 64 so that the port utilization ratio of the ports handled by the respective MPs 64 will be averaged. It is thereby possible to balance the load of certain MPs 64.

Moreover, if the port scan bitmap table 126 is created using the master bitmap table 124B, the respective MPs 64 will use the port scan bitmap table 126 with the contents of the master bitmap table 124B reflected therein during the subsequent port scan. The port scan can be sped up without having to check all ports.

Figure 40:
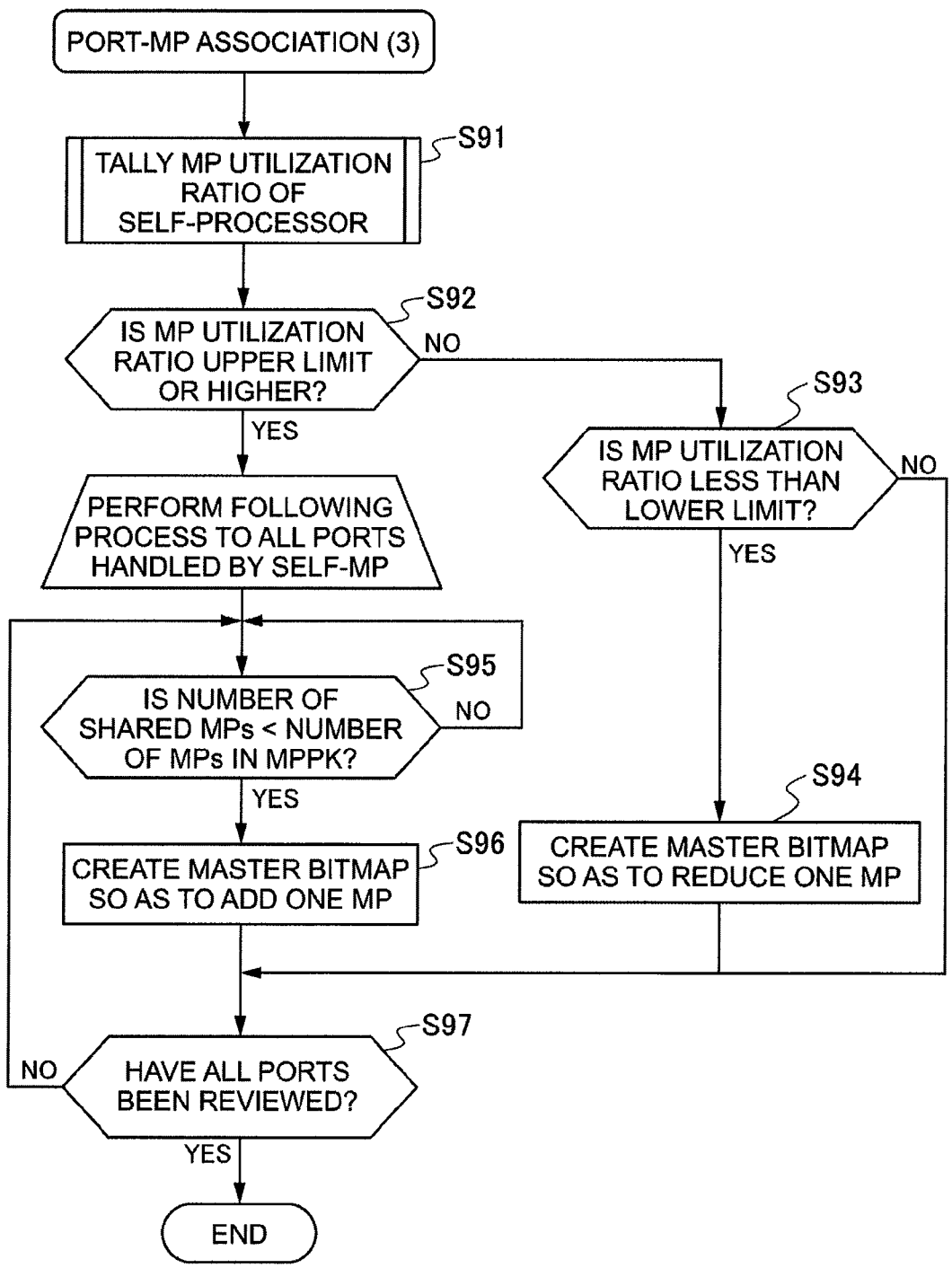
FIG. 40 is a flowchart explaining the third port-MP association method.

The third port-MP association method is now explained with reference to the flowchart of FIG. 40. This processing is performed by one arbitrary MP 64 in the respective MPPKs 36 in a prescribed cycle.

Figure 41:
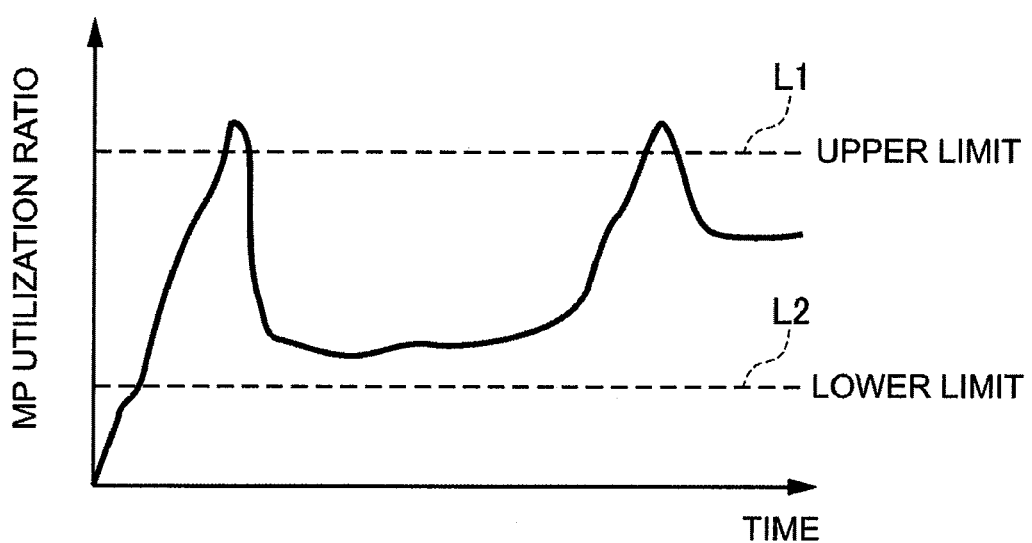
FIG. 41 is a diagram explaining the relationship of the MP utilization ratio and time.

Foremost, the MP 64 searches the PM 68 and tallies the MP utilization ratio of the self-MP 64 and, as shown in FIG. 41, determines whether the MP utilization ratio is greater than or equal to the upper threshold L1 (S92). If the MP utilization ratio is not greater than or equal to the upper threshold L1, the MP 64 determines whether the MP utilization ratio is less than the lower threshold L2 (S93). If the MP utilization ratio is less than the lower threshold L2, the MP 64 creates the master bitmap 124 in order to reduce one MP 64 among the MPs 64 sharing the associated ports (S94), and proceeds to the processing of step S97. If the MP 64 determines that the MP utilization ratio is not less than the lower threshold L2 at step S93, the MP 64 proceeds to the processing of step S97.

Meanwhile, if the MP 64 determines that the MP utilization ratio is greater than or equal to the upper threshold L1 at step S92, the following processing is performed to all ports being handled by the self-MP 64.

Specifically, the MP 64 determines whether the number of shared MPs<number of MPs in the MPPK (S95), and performs this processing once again upon obtaining a negative determination result in this step. If the MP obtains a positive determination result in this step, it creates the master bitmap table 124 in order to add one MP 64 to the MPs 64 sharing the associated ports according to the MP utilization ratio (S96).

Thereafter, the MP 64 determines whether the processing for reviewing all ports has been performed (S97), and returns to step S95 and repeats the processing from steps S95 to S97 if the processing for reviewing all ports has not been performed. Meanwhile, if the processing for reviewing all ports has been performed, the MP 64 thereby ends the processing of this routine.

As described above, the number of MPs 60 sharing the associated ports can be changed according to the MP utilization ratio. Here, since the load will be balanced if the number of MPs 64 is increased, the utilization ratio will deteriorate. However, as a result of setting a lower threshold L2 that is sufficiently low in relation to the upper threshold L1, it is possible to prevent the MP utilization ratio from oscillating even if the MP utilization ratio fluctuates.

Figure 42:
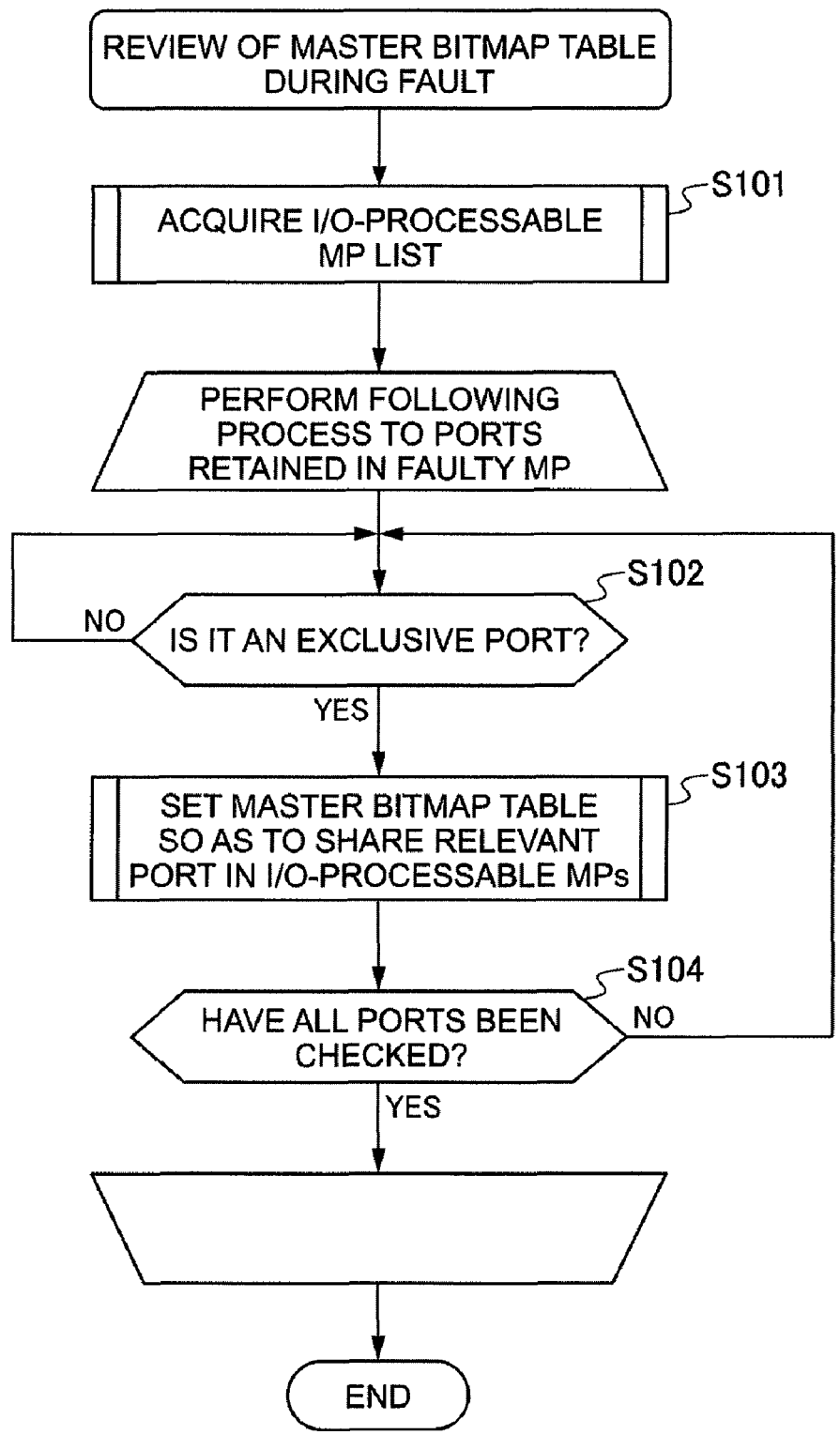
FIG. 42 is a flowchart explaining the port-MP association method during an MP fault.

As another example of a port-MP association method, the processing during an MP fault is now explained with reference to the flowchart of FIG. 42. This processing is performed by one arbitrary MP 64 in the respective MPPKs 36 at a prescribed cycle.

Foremost, if a fault occurs in any one of the MPs 64 belonging to the MPPK 36, a sound MP 64 refers to the master bitmap 124 in the PM 68, acquires an I/O-processable MP list (S101), and performs the following processing to the ports retained by the faulty MP 64.

For example, if a fault occurs in the #3 MP 64, any one MP 64 among the #0 to #2 MPs 64 determines whether the port retained by the #3 MP 64 is an exclusive port (S102). If it is not an exclusive port, the MP 64 repeats the processing of step S102. Meanwhile, if it is an exclusive port, the MP 64 sets a bit in the master bitmap 124 so as to share that port with the I/O-processable MPs 64 (S103).

Subsequently, the MP 64 determines whether all ports have been checked (S104), and returns to the processing of step S102 and repeats the processing of steps S102 to S104 if all ports have not been checked. Meanwhile, if all ports have been checked, the MP 64 thereby ends the processing of this routine.

Figure 43:
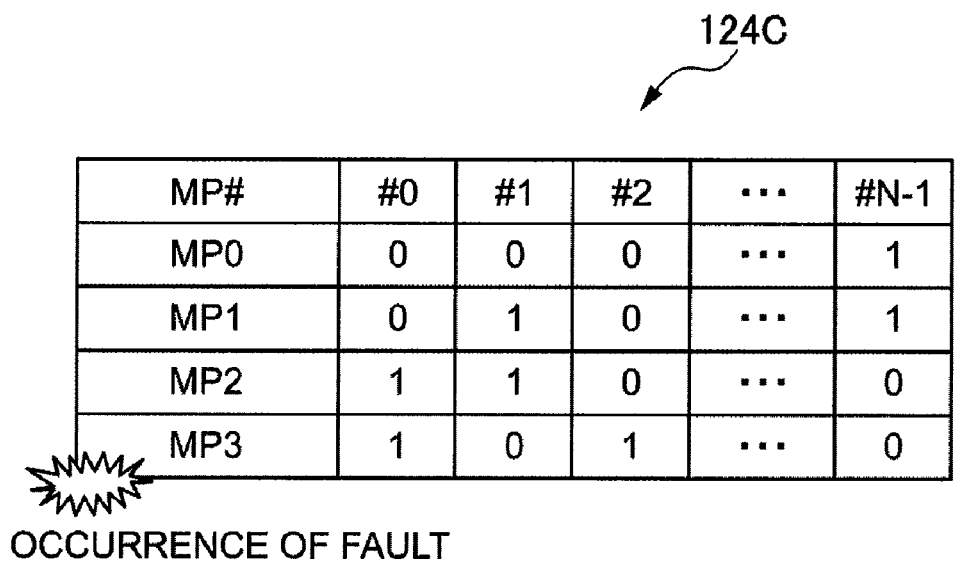
FIG. 43 is a configuration diagram of a master bitmap table explaining the status during the occurrence of an MP fault.
Figure 44:
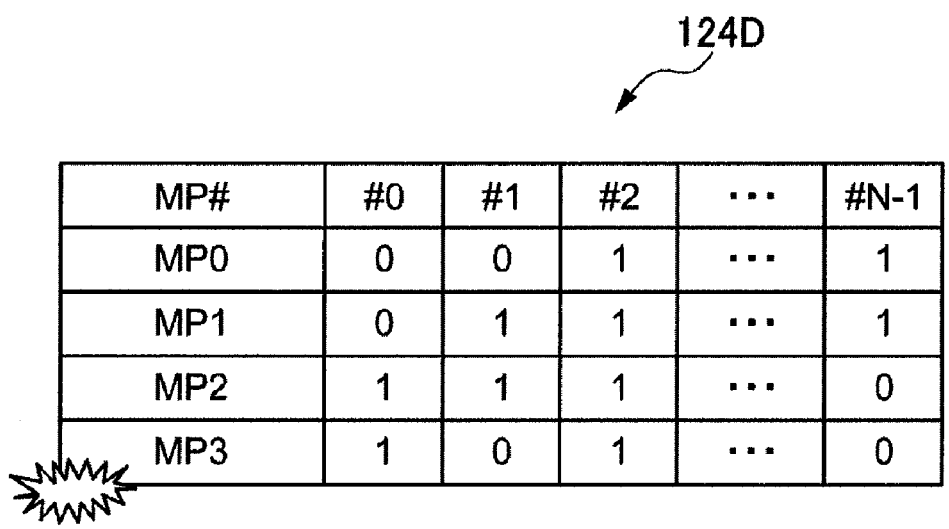
FIG. 44 is a configuration diagram of a master bitmap table explaining a state when a sound MP handles the processing during an MP fault.

In the foregoing case, when the master bitmap table 124 shown in FIG. 43 is being used as the master bitmap table 124 and a fault occurs in the #3 MP 64, the MP 64 performs processing for causing the #0 to #2 MPs 64 to handle the ports such as the #0 and #2 ports that are retained by the #3 MP 64, and creates the master bitmap table 124C as the master bitmap table 124D as shown in FIG. 44.

Here, since the #2 MP 64 is already handling the processing in addition to the #3 MP 64 regarding the #0 port, the #2 MP 64 will continue to handle the processing without change. Meanwhile, since only the #3 MP 64 is handling the processing regarding the #2 port, the #0 to #2 MPs 64 will respectively handle the processing.

As described above, if a fault occurs in the #3 MP 64, as a result of sharing the processing of the #2 port, which is being exclusively performed by the #3 MP 64, with the #0 to #2 MPs 64, the I/O processing to the exclusive port (#2 port) that was being exclusively performed by the #3 MP 64 can be continued by other MPs 64.

Figure 45:
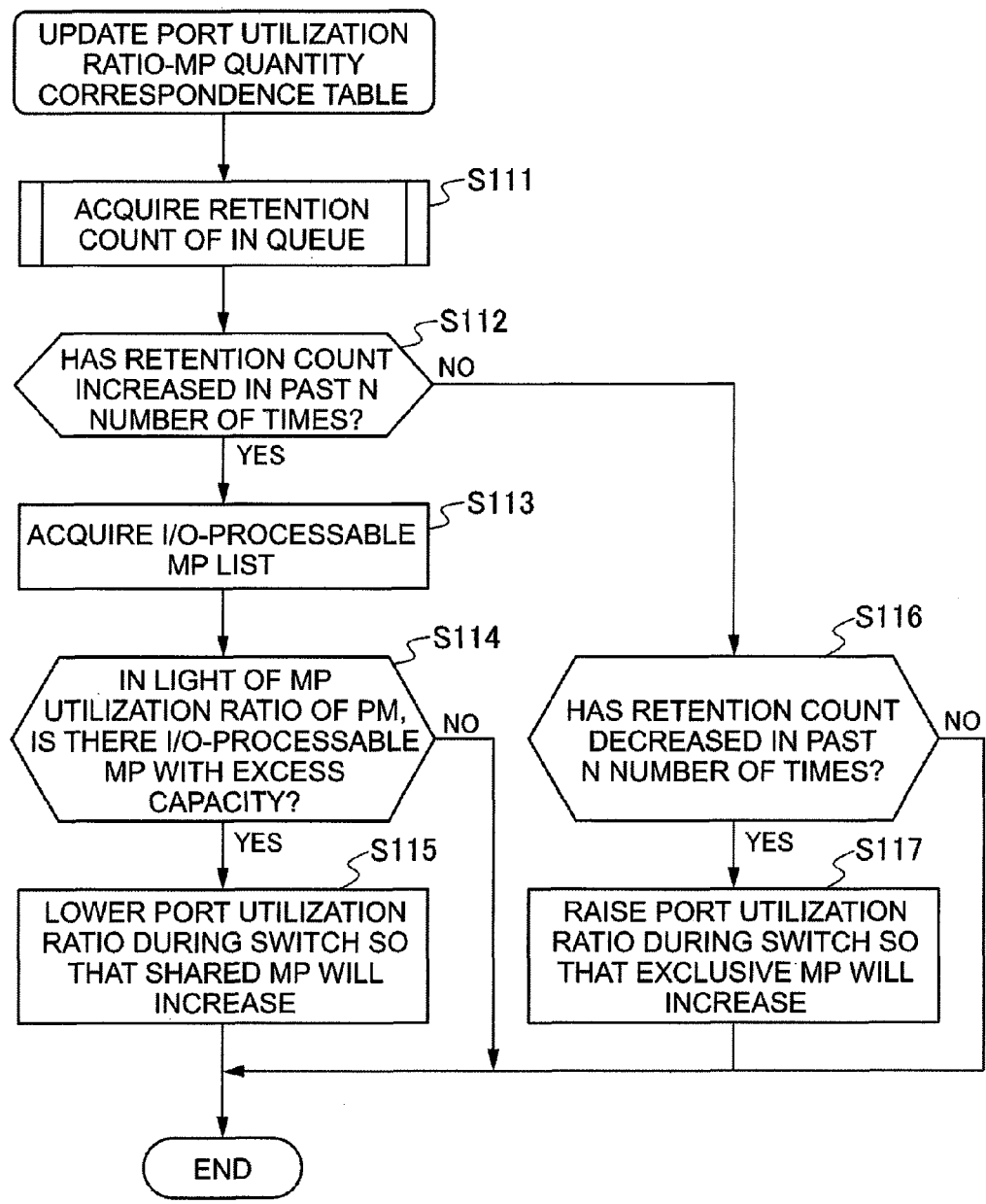
FIG. 45 is a flowchart explaining the processing of dynamically changing the port utilization ratio-MP quantity correspondence table.

The processing contents of dynamically changing the contents of the port utilization ratio-MP quantity correspondence table 146 are now explained with reference to the flowchart of FIG. 45. This processing is performed by one arbitrary MP 64 in the MPPK 36 at a prescribed cycle.

Foremost, the MP 64 refers to the port IN queue 80 or the port IN queue 90, acquires the queue retention count of the IN queue 81 or the IN queue 91 (S111). Subsequently, in order to prevent the performance from becoming unstable as a result of being influence by a temporary fluctuation, the MP 64 determines whether the queue retention count has increased in the past N number of times (S112).

If the MP 64 determines at step S112 that the queue retention count has increased in the past N number of times, the MP 64 refers to the master bitmap table 124 in order to exclude the influence of the MPs 64 that are not I/O processable due to an MP fault or MP replacement, and acquires a list of the I/O-processable MPs 64 (S113).

Subsequently, the MP 64 refers to the PM 68, and determines whether there is an MP 64 with an excess capacity and which is an I/O-processable MP 64 based on the MP utilization ratio of the respective MPs 64 (S114). If the MP 64 obtains a negative determination result at step S114, it thereby ends the processing of this routine. Meanwhile, if the MP 64 obtains a positive determination result at step S114, it performs processing for lowering the port utilization ratio during the switch (during the change) so as to increase the number of shared MPs 64 (S115), and thereby ends the processing of this routine.

At step S114, since it would be meaningless to share the ports during the overload of the MP 64, or if the number of I/O-processable MPs 64 will decrease due to an MP fault or MP replacement, the processing for review is not performed.

Figure 46:
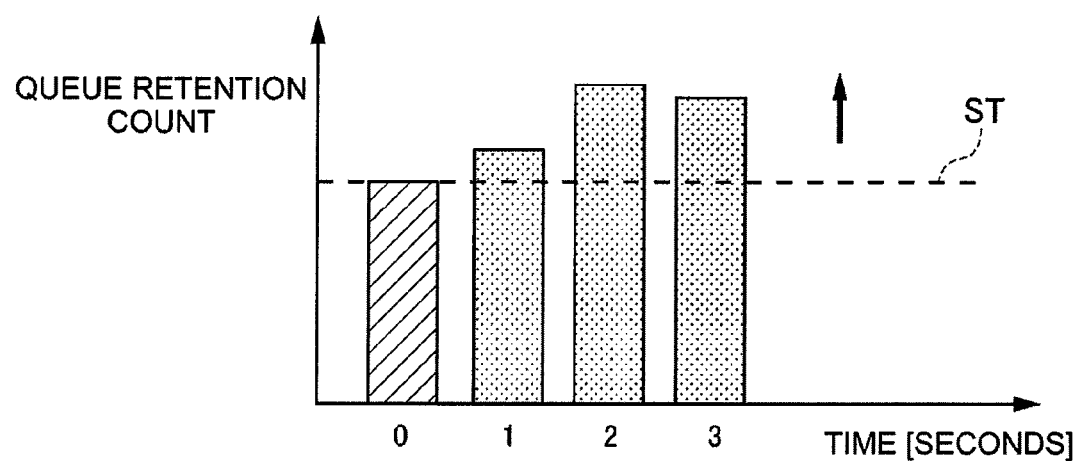
FIG. 46 is a diagram explaining the relationship of the queue retention count and time in night-time batch processing.
Figure 47:
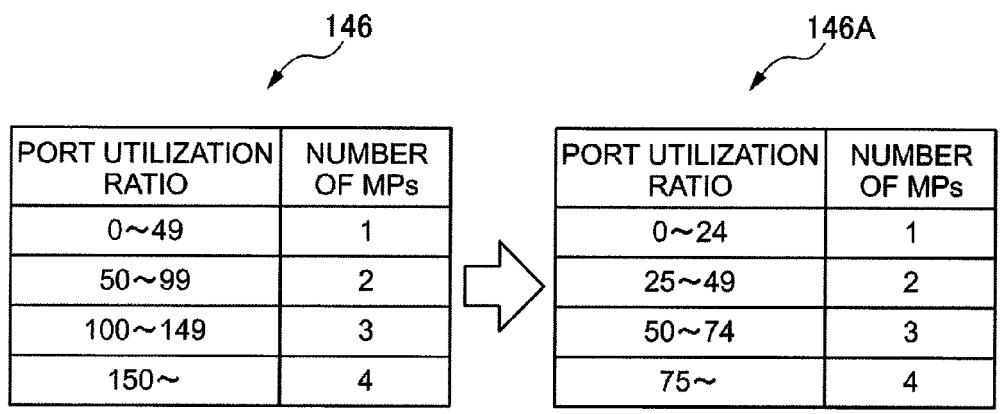
FIG. 47 is a diagram explaining the method of changing the threshold of the port utilization ratio-MP quantity correspondence table to ½.

As a result of performing the processing of step S111 to step S115, when the queue retention count of the queues 81, 91 increases, for instance, as shown in FIG. 46, if the queue retention count increases successively than the reference value ST showing the queue retention count during the previous review in the night-time batch processing, as shown in FIG. 47, the threshold=tuning parameter of the port utilization ratio 148 in the port utilization ratio-MP correspondence table 146 is changed to ½, and the port utilization ratio-MP quantity correspondence table 146A in which the threshold=tuning parameter was changed to ½ is thereby created.

In the foregoing case, with the threshold=tuning parameter of the port utilization ratio 148, "0 to 49" is changed to "0 to 24," "50 to 99" is changed to "25 to 49," "100 to 149" is changed to "50 to 74," and "150 or more" is changed to "75 or more."

Meanwhile, if the MP 64 determines at step S112 that the queue retention count has not increased in the past N number of times, it determines whether the queue retention count has described in the past N number of times (S116). If the queue retention count has not decreased in the past N number of times, the MP 64 thereby ends the processing of this routine. Meanwhile, if the queue retention count has decreased in the past N number of times, the MP 64 performs processing for increasing the port utilization ratio during the switch so as to increase the number of exclusive MPs 64 (S117), and thereby ends the processing of this routine.

Figure 48:
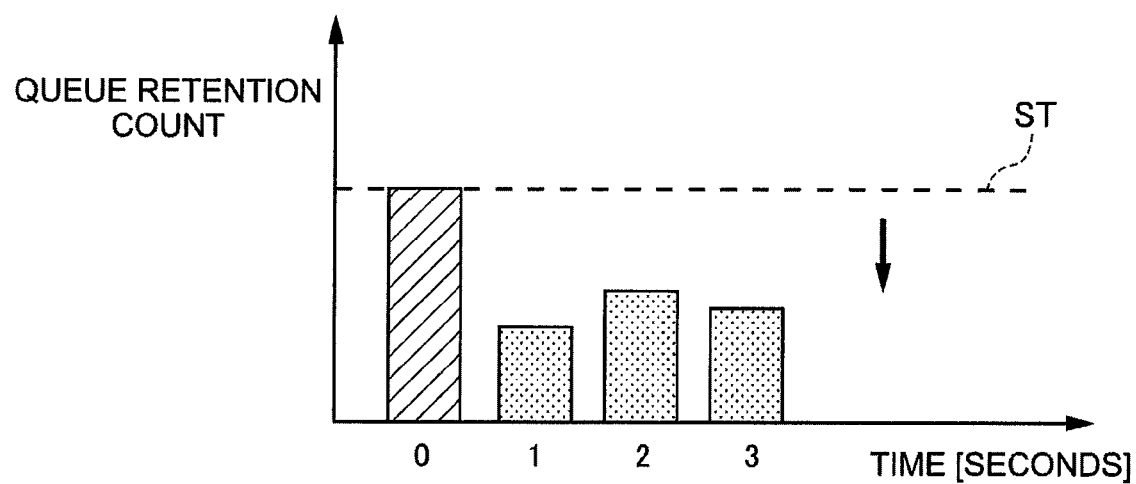
FIG. 48 is a diagram explaining the relationship of the queue retention count and time at the end of batch processing.
Figure 49:
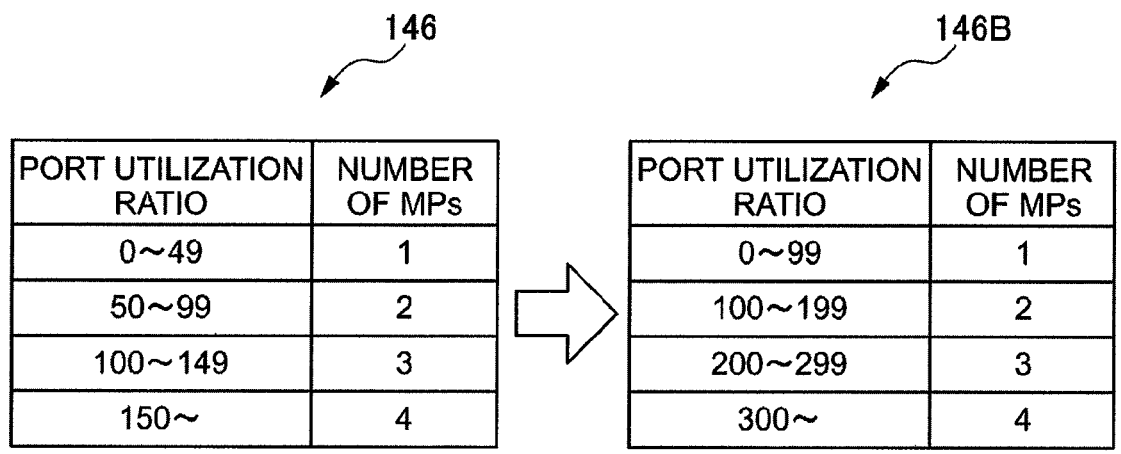
FIG. 49 is a diagram explaining the state when the threshold of the port utilization ratio-MP quantity correspondence table was changed to double.

Specifically, when the processing of steps S111, S112, S116, and S117 is performed, for example, as shown in FIG. 48, if the queue retention count is successively decreasing from the reference value ST pursuant to the completion of the batch processing, as shown in FIG. 49, the threshold=parameter of the port utilization ratio 48 in the port utilization ratio-MP correspondence table 146 is doubled, and the port utilization ratio-MP quantity correspondence table 146B is thereby created.

In the foregoing case, with the threshold=tuning parameter of the port utilization ratio 148, "0 to 49" is changed to "0 to 99," "50 to 99" is changed to "100 to 199," "100 to 149" is changed to "200 to 299," and "150 or more" is changed to "300 or more," respectively.

As described above, as a result of dynamically reviewing the value of the port utilization ratio-MP quantity correspondence table 146 based on the queue retention count (I/O retention count) and the MP utilization ratio of the IN queues 81, 91, it is possible to achieve the optimal number of MPs according to the queue retention count (I/O retention count).

For example, if the queue retention count has increased, as a result of changing the threshold of the port utilization ratio 148 to ½, even if the port utilization ratio of the respective MPs 64 increases, a large numerical value can be used as the value of the MP quantity 150 in the port utilization ratio-MP quantity correspondence table 146 according to the increase in the port utilization ratio of the respective MPs 64. Thus, processing can be performed with numerous MPs 64.

Contrarily, if the queue retention count has decreased, as a result of doubling the threshold of the port utilization ratio 148, even if the port utilization ratio of the respective MPs 64 changes, processing can be performed with few MPs 64 while the port utilization ratio of the respective MPs 64 is within the threshold range.

According to this example, since the respective MPs 64 belonging to the respective controllers 60 execute a port scan with the queue corresponding to a specified port among the respective queues 81, 91 belonging to the PM (main memory) 68 as the search target, the number of queues 81, 91 as the search target of the respective MPs 64 can be decreased, whereby information such as the command (I/O request) stored in the respective queues 81, 91 can be searched quickly.

Moreover, according to this example, if the respective MPs 64 belonging to the respective controllers 60 are to place more emphasis on the response time than the throughput upon selecting the exclusive mode or the share mode, as a result of selecting the exclusive mode, it is possible to prevent the occurrence of a lock contention and prevent another MP 64 from acquiring information concerning a port event, and also possible to prevent the delay in the response time.

Meanwhile, if the respective MPs 64 belonging to the respective controllers 60 are to place more emphasis on the throughput than the response time upon selecting the exclusive mode or the share mode, as a result of selecting the shared mode, the processing concerning one port can be shared among a plurality of MPs 64, and this will contribute to the improvement in the throughput.

REFERENCE SIGNS LIST

10 Open system host computer
12 Mainframe host computer
14 Storage subsystem
16, 18 Network
20 Open port package
22 Mainframe port package
24 Drive port package 26 Cache memory
28 Shared memory
30 Switch package
34 Storage device
38 HDD
52 Open port MP
54 MF port MP
56 Drive port MP
36 MPPK
60 Controller
62 Storage unit
64 MP
68 PM
70 LM
76 MP search table
80 Open port IN queue
86 MP search table
90 MF port IN queue
120, 124 Master bitmap table
126 Port scan bitmap table
128 Event bitmap table
130 LDEV-port correspondence table
136 LDEV-MPPK correspondence table
140 Port utilization ratio table
146 Port utilization ratio-MP quantity correspondence table

The invention claimed is:

1. A storage subsystem connected to a host computer via a network, comprising:
   a first interface unit for sending and receiving information to and from the host computer via a plurality of ports, and performing data access control processing according to commands input from each of the ports;
   a storage device for storing data;
   a second interface unit connected to the storage device, and for performing data Input/Output (I/O) processing of inputting and outputting data to and from the storage device;
   a plurality of controllers connected to the first interface unit and the second interface unit, and for performing data I/O processing to a plurality of virtual devices to which at least a part of a storage area of the storage device is allocated;
   a cache memory for temporarily storing data associated with the processing of the first interface unit and the second interface unit and the plurality of controllers;
   and a shared memory for storing control information to be shared by the plurality of controllers,
   wherein each of the controllers includes a main memory for storing the control information stored in the shared memory as control information that is common to each of the controllers, and a plurality of microprocessors for performing data I/O processing to the virtual devices according to the control information stored in the main memory,
   wherein, when the host computer issues a data I/O request to one virtual device among the plurality of virtual devices via each of the ports, the first interface unit specifies a controller to handle the data I/O processing to the one virtual device according to the I/O request among the plurality of controllers based on the I/O request,
   wherein the controller that received the I/O request selects an exclusive mode where a single microprocessor among the plurality of microprocessors exclusively performs the data I/O processing to the one virtual device, if load information concerning each of the ports shows a low load condition, wherein the controller that received the I/O request selects a shared mode where two or more microprocessors share the data I/O processing to the one virtual device, if the load information concerning each of the ports shows a high load condition, and wherein the controller performs the data I/O processing according to the selected exclusive mode or shared mode.

2. The storage subsystem according to claim 1,
   wherein the main memory belonging to each of the controllers includes a plurality of queues corresponding to the plurality of ports as areas for storing the I/O request input into each of the ports, and
   wherein each of the microprocessors belonging to each of the controllers executes, with a queue corresponding to a predetermined port as a check-target port among each of the queues belonging to the main memory as a search-target queue, a port scan against the search-target queue and, upon obtaining the I/O request as a result of executing the port scan, executes processing of the I/O request input into the port corresponding to the queue storing that I/O request, updates the search-target queue by excluding a queue in which the I/O request does not exist from the search-target queue by executing the port scan among the search-target queues, and executes the port scan against the updated search-target queue in the subsequent port scans.

3. The storage subsystem according to claim 1,
   wherein the main memory belonging to each of the controllers includes a plurality of queues corresponding to the plurality of ports as areas for storing the I/O request input into each of the ports, and
   wherein each of the microprocessors belonging to each of the controllers executes a port scan with a queue corresponding to a predetermined port as a check-target port among each of the queues belonging to the main memory as a search target and, upon obtaining the I/O request as a result of executing the port scan, executes processing of the I/O request input into the port corresponding to the queue storing that I/O request.

4. The storage subsystem according to claim 1,
   wherein the main memory belonging to each of the controllers includes a plurality of queues corresponding to the plurality of ports as areas for storing the I/O request input into each of the ports, and
   wherein each of the microprocessors belonging to each of the controllers executes a port scan with a queue corresponding to a port to which the virtual device is allocated in advance among each of the queues belonging to the main memory as a search target and, upon obtaining the I/O request as a result of executing the port scan, executes processing of the I/O request input into the port corresponding to the queue storing that I/O request.

5. The storage subsystem according to claim 1,
   wherein the main memory belonging to each of the controllers includes a plurality of queues corresponding to the plurality of ports as areas for storing the I/O request input into each of the ports, and
   wherein each of the microprocessors belonging to each of the controllers executes a port scan with a queue corresponding to a port other than ports that have not received the I/O request for a given period of time among each of the queues belonging to the main memory as a search target and, upon obtaining the I/O request as a result of executing the port scan, executes processing of the I/O request input into the port corresponding to the queue storing that I/O request.

6. The storage subsystem according to claim 1,
wherein each of the microprocessors belonging to each of the controllers measures, for each set time, the processing time required for processing the I/O request input into each of the ports, and sequentially updates each of the measurements, and
wherein each of the microprocessors belonging to a controller that received the I/O request transferred from the first interface unit compares each of the updated measurements and a threshold upon receiving the I/O request, selects the exclusive mode as the processing of the I/O request input into each of the ports upon obtaining, based on the comparative result, load information in which the processing time required for processing the I/O request is lower than the threshold as the load information concerning each of the ports, and selects the shared mode as the processing of the I/O request input into each of the ports upon obtaining, based on the comparative result, load information in which the processing time required for processing the I/O request exceeds the threshold value as the load information concerning each of the ports.

7. The storage subsystem according to claim 1,
wherein each of the microprocessors belonging to each of the controllers calculates a microprocessor utilization ratio associated with the processing of the I/O request input into each of the ports, and respectively calculates a port utilization ratio concerning each of the ports based on the calculated microprocessor utilization ratio, and
wherein each of the microprocessors belonging to a controller that received the I/O request transferred from the first interface unit determines the high or low of each of the calculated microprocessor utilization ratios upon receiving the I/O request, selects the exclusive mode as the processing of the I/O request input into each of the ports upon obtaining, based on the determination result, load information in which the calculated port utilization ratio shows a low value as the load information concerning each of the ports, and selects the shared mode as the processing of the I/O request input into each of the ports upon obtaining, based on the determination result, load information in which the calculated port utilization ratio shows a high value as the load information concerning each of the ports.

8. The storage subsystem according to claim 1,
wherein each of the microprocessors belonging to each of the controllers calculates a microprocessor utilization ratio associated with the processing of the I/O request input into each of the ports, and respectively calculates a port utilization ratio concerning each of the ports based on the calculated microprocessor utilization ratio, and
wherein each of the microprocessors belonging to a controller that received the I/O request transferred from the first interface unit calculates a total of each of the calculated port utilization ratios for each of the ports as load information concerning each of the ports upon receiving the I/O request, divides the total calculated regarding each of the ports by the number of microprocessors set in correspondence with a threshold of the port utilization ratio, corrects the port utilization ratio in relation to each of the microprocessors based on the port utilization ratio obtained by the division and distributes the port utilization ratio concerning each of the ports to a plurality of microprocessors, and decides the microprocessor to handle the processing of the I/O request input into each of the ports based on the distributed port utilization ratio.

9. The storage subsystem according to claim 1,
wherein each of the microprocessors belonging to each of the controllers calculates a microprocessor utilization ratio associated with the processing of the I/O request input into each of the ports, and respectively calculates a port utilization ratio concerning each of the ports based on the calculated microprocessor utilization ratio, and
wherein each of the microprocessors belonging to a controller that received the I/O request transferred from the first interface unit calculates a total of each of the calculated port utilization ratios for each of the ports as load information concerning each of the ports upon receiving the I/O request, calculates an average value of the total calculated regarding each of the ports, corrects the port utilization ratio in relation to each of the microprocessors based on the calculated average value and averages the port utilization ratio in relation to each of the microprocessors, and decides the microprocessor to handle the processing of the I/O request input into each of the ports based on the averaged port utilization ratio.

10. The storage subsystem according to claim 1,
wherein each of the microprocessors belonging to each of the controllers calculates a microprocessor utilization ratio associated with the processing of the I/O request input into each of the ports, and respectively calculates a port utilization ratio concerning each of the ports based on the calculated microprocessor utilization ratio, and
wherein a controller that received the I/O request transferred from the first interface unit uses, when selecting the shared mode upon receiving the I/O request, a plurality of thresholds concerning the calculated microprocessor utilization ratio and the microprocessor utilization ratio as information for selecting microprocessors to be used in the shared mode, adds one microprocessor to be used in the shared mode when each of the calculated microprocessor utilization ratios exceeds an upper threshold among a plurality of thresholds concerning the microprocessor utilization ratio, and subtracts one microprocessor to be used in the shared mode when each of the calculated microprocessor utilization ratios falls below a lower threshold among a plurality of thresholds concerning the microprocessor utilization ratio.

11. The storage subsystem according to claim 1,
wherein the main memory belonging to each of the controllers includes a plurality of queues corresponding to the plurality of ports as areas for storing the I/O request input into each of the ports, and
wherein each of the microprocessors belonging to each of the controllers sequentially executes a port scan with each of the queues belonging to the main memory as a search target, sequentially measures a queue retention count showing the retention count of the I/O requests that are retained in each of the queues, calculates a microprocessor utilization ratio associated with the processing of the I/O request input into each of the ports, and respectively calculates a port utilization ratio concerning each of the ports based on the calculated microprocessor utilization ratio, and
wherein a controller that received the I/O request transferred from the first interface unit compares, upon receiving the I/O request, each of the port utilization ratios calculated with each of the microprocessors and a plurality of thresholds prescribing a range of the port utilization ratio and determines to which threshold among the plurality of thresholds each of the calculated port utilization ratios belongs, decides the number of microprocessors to handle the processing concerning each of the queues according to the number of microprocessors set in correspondence with each of the thresholds based on the determination result, determines whether each of the measured queue retention counts is of an increasing trend or a decreasing trend in the past several times as load information concerning each of the ports during the process of executing the processing concerning each of the queues with the decided number of microprocessors, changes each of the thresholds based on the determination result, and decides the number of microprocessors to handle the processing concerning each of the queues based on each of the changed thresholds upon subsequently receiving the I/O request.

12. The storage subsystem according to claim 1,
wherein the main memory belonging to each of the controllers includes a plurality of queues corresponding to the plurality of ports as areas for storing the I/O request input into each of the ports, and
wherein each of the microprocessors belonging to each of the controllers sequentially executes a port scan with each of the queues belonging to the main memory as a search target, sequentially measures a queue retention count showing the retention count of the I/O requests that are retained in each of the queues, calculates a microprocessor utilization ratio associated with the processing of the I/O request input into each of the ports, and respectively calculates a port utilization ratio concerning each of the ports based on the calculated microprocessor utilization ratio, and
wherein a controller that received the I/O request transferred from the first interface unit compares, upon receiving the I/O request, each of the port utilization ratios calculated with each of the microprocessors and a plurality of thresholds prescribing a range of the port utilization ratio and determines to which threshold among the plurality of thresholds each of the calculated port utilization ratios belongs, decides the number of microprocessors to handle the processing concerning each of the queues according to the number of microprocessors set in correspondence with each of the thresholds based on the determination result, determines whether each of the measured queue retention counts is of an increasing trend or a decreasing trend in the past several times as load information concerning each of the ports during the process of executing the processing concerning each of the queues with the decided number of microprocessors, lowers each of the thresholds upon determining that each of the measured queue retention counts is of an increasing trend in the past several times, increases each of the thresholds upon determining that each of the measured queue retention counts is of a decreasing trend in the past several times, and decides the number of microprocessors to handle the processing concerning each of the queues based on each of the decreased thresholds or each of the increased thresholds upon subsequently receiving the I/O request.

* * * * *